(12) United States Patent
Joung et al.

(10) Patent No.: US 10,934,375 B2
(45) Date of Patent: Mar. 2, 2021

(54) HIGH-DENSITY ETHYLENE-BASED POLYMER USING HYBRID SUPPORTED METALLOCENE CATALYST, AND PREPARATION METHOD

(71) Applicant: HANWHA CHEMICAL CORPORATION, Seoul (KR)

(72) Inventors: Ui Gab Joung, Daejeon (KR); Dong Wook Jeong, Daejeon (KR); Won Jun Kang, Changwon-si (KR); Dong Ok Kim, Seoul (KR); Song Hee Yang, Incheon (KR); In Jun Lee, Suwon-si (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 126 days.

(21) Appl. No.: 16/096,795

(22) PCT Filed: Feb. 10, 2017

(86) PCT No.: PCT/KR2017/001502
§ 371 (c)(1),
(2) Date: Dec. 13, 2018

(87) PCT Pub. No.: WO2017/188569
PCT Pub. Date: Nov. 2, 2017

(65) Prior Publication Data
US 2019/0127503 A1    May 2, 2019

(30) Foreign Application Priority Data
Apr. 27, 2016  (KR) .................. 10-2016-0051833

(51) Int. Cl.
| C08F 210/16 | (2006.01) |
| C08F 210/02 | (2006.01) |
| C08F 10/02 | (2006.01) |
| C08F 2/44 | (2006.01) |
| C08F 4/02 | (2006.01) |
| C08F 4/642 | (2006.01) |
| C08F 4/6592 | (2006.01) |
| C08F 4/659 | (2006.01) |
| C08F 4/646 | (2006.01) |
| C08F 2/34 | (2006.01) |

(52) U.S. Cl.
CPC .............. *C08F 210/16* (2013.01); *C08F 2/34* (2013.01); *C08F 2/44* (2013.01); *C08F 4/02* (2013.01); *C08F 4/642* (2013.01); *C08F 4/646* (2013.01); *C08F 4/659* (2013.01); *C08F 4/6592* (2013.01); *C08F 10/02* (2013.01); *C08F 2420/01* (2013.01); *C08F 2420/03* (2013.01)

(58) Field of Classification Search
CPC .................... C08F 210/16; C08F 4/65925; C08F 4/65927; C08F 2410/03; C08F 2500/07; C08F 2500/12
See application file for complete search history.

(56) References Cited

U.S. PATENT DOCUMENTS

| 7,294,600 B2 | 11/2007 | Lee et al. | |
| 2006/0235171 A1 | 10/2006 | Lee et al. | |
| 2010/0121006 A1 | 5/2010 | Cho et al. | |
| 2019/0135961 A1* | 5/2019 | Joung | C08F 2/00 |
| 2019/0169323 A1* | 6/2019 | Lee | C08F 10/02 |
| 2019/0169325 A1* | 6/2019 | Lee | C08F 210/16 |
| 2019/0263942 A1* | 8/2019 | Jeong | C08F 210/16 |

FOREIGN PATENT DOCUMENTS

| CN | 1697843 A | 11/2005 |
| CN | 101679540 B | 9/2012 |
| EP | 3 428 201 A1 | 1/2019 |
| JP | 2007-177168 A | 7/2007 |
| JP | 2007-197722 A | 8/2007 |
| KR | 10-0221164 B1 | 9/1999 |
| KR | 10-2004-0085650 A | 10/2004 |
| KR | 10-2008-0104331 A | 12/2008 |

* cited by examiner

*Primary Examiner* — Rip A Lee
(74) *Attorney, Agent, or Firm* — Sughrue Mion, PLLC

(57) ABSTRACT

The present invention relates to a high-density ethylene-based polymer comprising: an ethylene homopolymer; or a copolymer of ethylene and at least one comonomer selected from the group consisting of α-olefins, cyclic olefins and linear, branched and cyclic dienes. According to the present invention, the high-density ethylene-based polymer has a wide molecular weight distribution and excellent comonomer distribution characteristics, has excellent melt flowability due to a long chain branched structure, and has excellent mechanical characteristics since the comonomer distribution is concentrated in a high-molecular-weight body. The high-density ethylene polymer of the present invention has excellent molding processability during processing such as extrusion, compression, injection and rotational molding by having excellent mechanical characteristics and melt flowability.

20 Claims, 4 Drawing Sheets

HIGH-DENSITY ETHYLENE-BASED POLYMER USING HYBRID SUPPORTED METALLOCENE CATALYST, AND PREPARATION METHOD

CROSS REFERENCE TO RELATED APPLICATIONS

This application is a National Stage of International Application No. PCT/KR2017/001502 filed Feb. 10, 2017, claiming priority based on Korean Patent Application No. 10-2016-0051833 filed Apr. 27, 2016, the disclosure of which is incorporated herein in its entirety by reference.

TECHNICAL FIELD

The present invention relates to a high-density ethylene copolymer using a hybrid supported metallocene catalyst and a preparation method thereof, and more specifically, to a high-density ethylene-based polymer which includes a high molecular weight, exhibits excellent mechanical characteristics since a content of a comonomer is relatively concentrated in a high-molecular-weight body, and has excellent melt flowability due to a wide molecular weight distribution and a long chain branched structure.

BACKGROUND ART

The mechanical and thermal characteristics of polyethylene resins are affected by molecular weight and density, and the application fields are changed accordingly. Generally, as the density of the polyethylene polymer is lower, the transparency and impact strength thereof become better, but the polyethylene polymer has a disadvantage that the physical properties such as heat resistance, hardness, and flexural modulus are deteriorated and the chemical resistance is also deteriorated.

On the other hand, as the density of the polyethylene polymer is higher, the physical properties such as heat resistance, hardness, and flexural modulus become better, and the chemical resistance increases, but the transparency and impact strength thereof are deteriorated. Therefore, when producing injection products using an ethylene copolymer, especially food containers or the like, it is very difficult to produce injection products having excellent impact strength and excellent chemical resistance. In particular, since injection products such as food containers required in the market require high impact resistance, the necessity of such technology is very high.

High-density polyethylene polymers are available for many applications through various molding methods. For example, as a typical method for a film molded product, there is an inflation method in which a molten polymer extrudate is inflated by melting a high-density polyethylene polymer and extruding a high-density polyethylene polymer from a mold while blowing air thereinto. In addition, as a method for obtaining a molded product having a desired shape, there is a blow molding method in which a molten high-density polyethylene polymer is blown into a cavity of a die and air is blown into a molten resin in the cavity of the die so as to expand and press the molten resin on a cavity inner wall to thereby form a molten polymer in the cavity. There is also an injection molding method in which a molten high-density polyethylene polymer is pressed in a cavity of a die so as to fill the cavity.

As described above, the high-density polyethylene polymer may be prepared by various molding methods, but these methods are common in that the high-density polyethylene polymer is first heated to a molten state and then molded. Therefore, the behavior of the high-density polyethylene polymer at the time of heating and melting, that is, the melting property, is an extremely important physical property in the molding of the high-density polyethylene polymer.

In particular, in the molding such as extrusion molding, compression molding, injection molding, or rotational molding, the melting property, especially the melt flowability of the high-density polyethylene-based polymer, is an essential property that affects satisfactory moldability. The molding processability used herein is not limited to the processability at the time of extrusion molding, compression molding, injection molding, or rotational molding.

Generally, it can be said that melt flowability is more excellent as an MI, an MFI, or an MFR is larger. Practically, however, since properties required for polymers as molding materials are different for each molding method, the index used as the standard indicating molding processability is changed according to the molding method. For example, in the injection molding method, a high-density polyethylene polymer having a narrow molecular weight distribution tends to be used so as to obtain a molded product having impact resistance.

The high-density polyethylene polymer conventionally used for extrusion molding, compression molding, injection molding, or rotational molding is generally prepared by using a titanium-based Ziegler-Natta catalyst or a chromium-based catalyst.

The high-density polyethylene polymer prepared by using such a catalyst can improve melt flowability due to a wide molecular weight distribution, but has a drawback in which mechanical properties such as impact resistance are significantly deteriorated due to mixing of low-molecular-weight components, and chemical resistance is deteriorated since a comonomer is intensively distributed in a low-molecular-weight body. Therefore, there has been a problem that it is impossible to increase a speed in injection molding while maintaining excellent mechanical properties.

To solve these problems, many studies on metallocene catalysts have been conducted. U.S. Pat. No. 6,525,150 discloses a metallocene catalyst capable of producing a resin having a narrow molecular weight distribution, and in the case of a copolymer, a uniform comonomer distribution by using uniform active sites of metallocene. However, since the molecular weight distribution is narrow, the mechanical strength is excellent, but the molding processability is low.

As described above, in the case of a single metallocene catalyst, since a molecular weight distribution is narrow due to uniform active sites, molding processability is not satisfactory. Therefore, the application development of metallocene catalyst systems has not been much conducted in the field of high-density polyethylene polymers in which the balance between mechanical properties and moldability is important.

In order to solve these problems, many proposals have been made to widen a molecular weight distribution by using a plurality of reactors or by mixing many kinds of metallocene catalysts.

However, when the method for widening the molecular weight distribution is used, moldability is improved, but other physical properties are inevitably deteriorated. Thus, it is impossible to obtain a high-density polyethylene polymer having excellent physical properties, such as mechanical strength, which can be obtained by narrowing the molecular weight distribution.

In addition, a method for improving a melt tension by maintaining an intrinsic viscosity of a catalyst has been proposed, but this method cannot improve the deterioration of melt flowability and thus high-speed molding is difficult.

In order to solve the problem of the metallocene catalyst, the melt flowability of the polymer is improved by using a catalyst in which a long chain branch (LCB) is introduced into a main chain of the polymer as a side branch, but there is a problem that mechanical properties such as impact resistance are significantly lower than those of the case of using a general metallocene catalyst.

In addition, as another method, a method for preparing polyolefin having a bimodal molecular weight distribution by using catalysts having different reactivity to a comonomer is proposed. However, the polyolefin having the bimodal molecular weight distribution, which is prepared in the above-described manner, has improved melt flowability, but has different molecular weight distributions and thus low kneading properties. Therefore, there is a problem that it is difficult to obtain a product having uniform physical properties after processing, and mechanical strength is deteriorated.

Many methods have been proposed so as to improve the mechanical properties and melt flowability of high-density polyethylene polymers prepared using metallocene catalysts, but most methods propose only the solution to linear low-density polyolefins. In addition, since metallocene has characteristics that the activity tends to decrease as the concentration of the comonomer decreases, the activity in the preparation of the high-density polyolefin is low and thus it is not cost-effective.

Even in the case of the catalyst having excellent activity and processability in preparation of the low-density polyolefin, the activity in the preparation of the high-density polyolefin is low and thus it is not cost-effective. In particular, in a gas phase process, a lot of fine particles are formed and stable work is difficult.

In a gas phase reactor, activity is an important factor. Due to the low activity, a large amount of fine particles are formed, causing a large amount of static electricity. The static electricity is attached to the wall surface of the reactor to obstruct a heat transfer and lower a polymerization temperature. In addition, since the fine particles attached to the wall surface of the reactor continue to grow, the production is stopped.

A catalyst for solving the above-described problems and preparing a high-density polyolefin polymer having excellent mechanical strength, excellent melt flowability, and high activity is continuously required, and the improvement thereof is required.

DESCRIPTION OF EMBODIMENTS

Technical Problem

The present invention has been made in an effort to solve the above-described problems.

The present invention provides a high-density ethylene-based polymer, which simultaneously satisfies mechanical properties, chemical resistance, and excellent molding processability that a conventional high-density ethylene-based polymer has not exhibited, and a preparation method thereof.

Another object of the present invention is to provide a high-density ethylene-based polymer, which has a unimodal molecular weight distribution that is excellent in impact strength, flexural strength, environmental stress cracking resistance (ESCR), and melt tension since a content of a comonomer is high-molecular-weight body prepared in the presence of a hybrid supported metallocene catalyst described below and the content of the comonomer is low in a low-molecular-weight body, and a preparation method thereof.

Another object of the present invention is to provide a high-density ethylene-based polymer, which has a wide molecular weight distribution and a long chain branched structure and thus has excellent productivity due to a small load during processing such as extrusion molding, compression molding, injection molding, or rotational molding, and a preparation method thereof.

Solution to Problem

In order to achieve the above-described objects of the present invention and achieve the characteristic effects of the present invention described below, the characteristic construction of the present invention is as follows.

According to one aspect of the present invention, there is provided an ethylene-based polymer having a density of 0.940 g/cm$^3$ to 0.970 g/cm$^3$, an MI of 0.1 g/10 min to 50 g/10 min, and an MFR of 35 to 100.

According to one aspect of the present invention, there is provided an ethylene-based polymer in which the time for which five cracks occur in environmental stress cracking resistance (ESCR) measured according to ASTM D1693 is 16 hours or more when the density is 0.950 g/cm$^3$ to 0.960 g/cm$^3$ and the MI is 1.0 g/10 min to 3 g/10 min, is 10 hours or more when the density is 0.950 g/cm$^3$ to 0.965 g/cm$^3$ and the MI is 6.0 g/10 min to 7.0 g/10 min, and is 9 hours or more when the density is 0.955 g/cm$^3$ to 0.960 g/cm$^3$ and the MI is 8.0 g/10 min to 9 g/10 min.

There is provided a catalyst composition for preparing polyolefin, in which a hybrid supported metallocene catalyst for polyolefin polymerization according to the present invention includes at least one first metallocene compound represented by Formula 1, at least one second metallocene compound represented by Formula 2, and at least one cocatalyst compound;

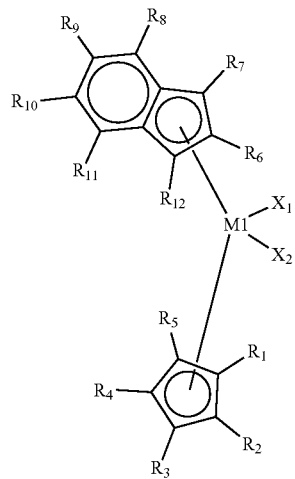

[Formula 1]

wherein, in Formula 1, M1 may be a group 4 transition metal of the periodic table of the elements, $X_1$ and $X_2$ may each independently be one of halogen atoms, $R_1$ to $R_{12}$ may each independently be a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and may be linked to each other to form a ring, cyclopentadiene linked to $R_1$ to $R_5$ and indene linked to $R_6$ to $R_{12}$ may have an asymmetric structure having different structures, and the cyclopentadiene and the indene may not be linked to each other to form a non-bridge structure.

[Formula 2]

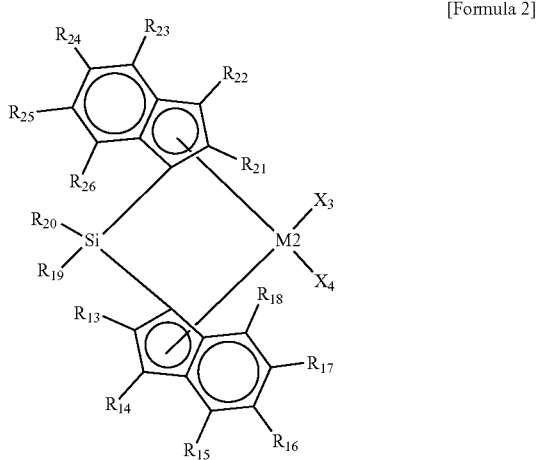

In Formula 2, M2 may be a group 4 transition metal of the periodic table of the elements, $X_3$ and $X_4$ may each independently be one of halogen atoms, $R_{13}$ to $R_{18}$ may each independently be a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and may be linked to each other to form a ring, $R_{21}$ to $R_{26}$ may each independently be a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and may be linked to each other to form a ring, $R_{19}$ and $R_{20}$ may each independently be a substituted or unsubstituted $C_1$-$C_{20}$ alkyl group and may be linked to each other to form a ring, indene linked to $R_{13}$ to $R_{18}$ and indene linked to $R_{21}$ to $R_{26}$ may have the same structure or different structures, and the indene linked to $R_{13}$ to $R_{18}$ and the indene linked to $R_{21}$ to $R_{26}$ may be linked to Si to form a bridge structure.

Advantageous Effects of Disclosure

A hybrid supported metallocene catalyst provided in the present invention has high activity characteristics in the preparation of a high-density ethylene-based polymer. In addition, the high-density ethylene-based polymer prepared in the presence of the catalyst is excellent in melt flowability, impact strength, flexural strength, environmental stress cracking resistance, and melt tension.

BEST MODE

Figure 1:
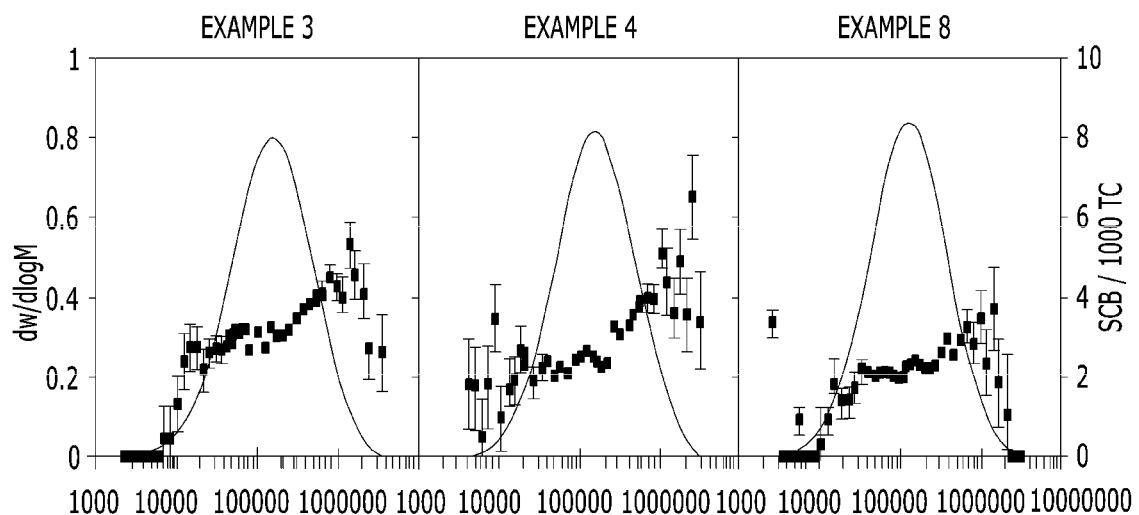
FIG. 1 is a graph showing GPC-IR analysis for confirming a comonomer distribution with respect to copolymers prepared in Examples 3, 4, and 8.

The present invention will be described with reference to specific embodiments and the accompanying drawings. The embodiments will be described in detail in such a manner that the present invention may be easily carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment. It should also be understood that the positions or arrangements of individual components within each disclosed embodiment may be modified without departing from the spirit and scope of the present invention. Therefore, the following detailed description is not intended as a limiting sense, and the scope of the present invention is limited only by the appended claims and the equivalents thereof, if properly described. In the drawings, like reference numerals refer to the same or similar functions throughout various aspects.

Hereinafter, embodiments of the present invention will be described with reference to the accompanying drawings, so that those of ordinary skill in the art can easily carry out the present invention.

The present invention includes a high-density ethylene-based polymer which is polymerized under existence of a hybrid supported metallocene catalyst.

Hybrid supported metallocene catalysts used herein each independently include at least one first metallocene compound, at least one second metallocene compound, and at least one cocatalyst compound.

The first metallocene compound, which is a transition metal compound according to the present invention, may be represented by Formula 1 below.

The first metallocene compound serves to exhibit high activity at the hybrid supported catalyst, and serves to improve melt flowability of a prepared polymer.

The first metallocene compound has a low mixing rate of a comonomer and has characteristics of forming a low-molecular-weight body, thereby improving processability in processing the polymer.

In addition, high density is formed due to low mixing of a comonomer, and high activity is exhibited even in high-density production.

Since the first metallocene compound has an asymmetric structure and a non-bridge structure having different ligands, the first metallocene compound forms a steric hindrance in which a comonomer hardly approaches a catalystic active site. Therefore, the first metallocene serves to reduce the mixing of the comonomer and exhibits both processability and high catalystic activity in the preparation of the hybrid supported metallocene.

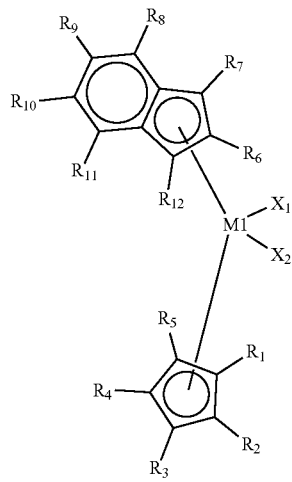

[Formula 1]

In Formula 1, M1 may be a group 4 transition metal of the periodic table of the elements, $X_1$ and $X_2$ may each independently be one of halogen atoms, $R_1$ to $R_{12}$ may each independently be a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and may be linked to each other to form a ring, cyclopentadiene linked to $R_1$ to $R_5$ and indene linked to $R_6$ to $R_{12}$ may have an asymmetric structure having different structures, and the cyclopentadiene and the indene may not be linked to each other to form a non-bridge structure.

In the present invention, ions or molecules coordinating with the transition metal (M1 and M2 in Formulae 1 and 2), such as cyclopendadiene linked to $R_1$ to $R_5$ and indene linked to $R_6$ to $R_{12}$ in Formula 1, and indene linked to $R_{13}$ to $R_{18}$ and indene linked to $R_{21}$ to $R_{26}$ are referred to as ligands.

In the present invention, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group, unless otherwise specified. In addition, the term "hydrocarbon group" means a linear, branched, or cyclic saturated or unsaturated hydrocarbon group, unless otherwise specified, and the alkyl group, the alkenyl group, the alkynyl group, and the like may be linear, branched, or cyclic.

In a specific example, examples of the transition metal compound represented by Formula 1 include transition metal compounds having the following structures and mixtures thereof, but the present invention is not limited thereto.

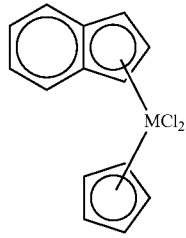

[Formula 1-1]

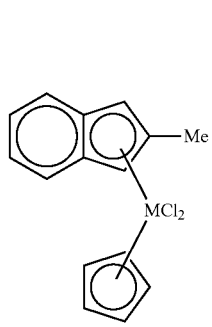

[Formula 1-2]

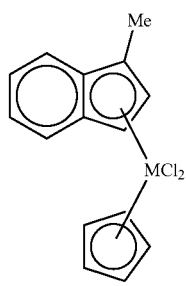

[Formula 1-3]

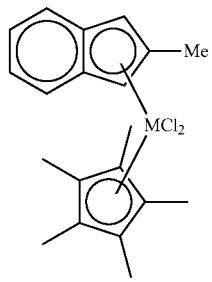

[Formula 1-4]

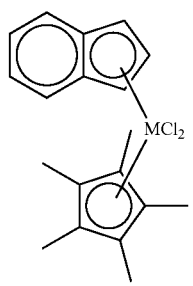

[Formula 1-5]

-continued
[Formula 1-6]
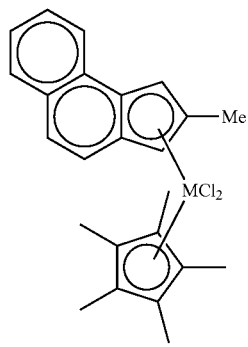
[Formula 1-7]
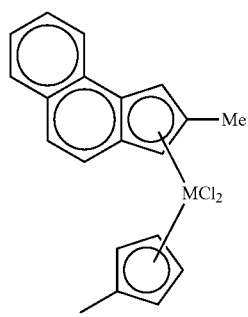
[Formula 1-8]
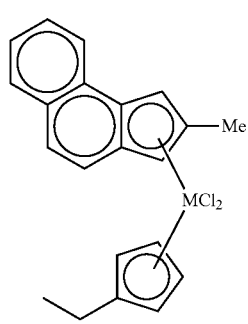
[Formula 1-9]
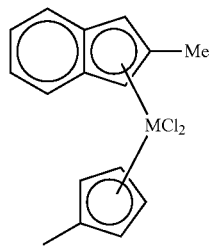
[Formula 1-10]
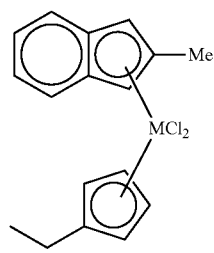
-continued
[Formula 1-11]
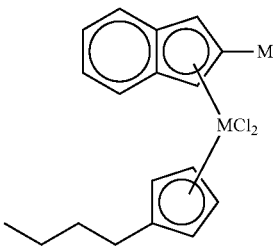
[Formula 1-12]
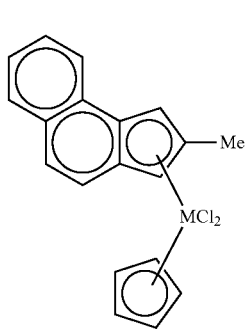
[Formula 1-13]
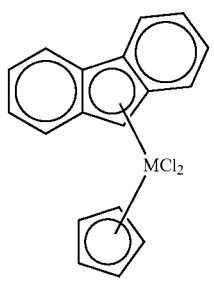
[Formula 1-14]
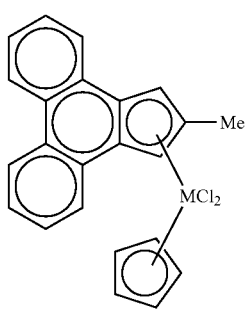
[Formula 1-15]
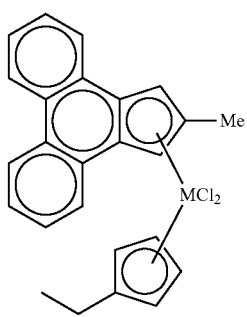

[Formula 1-16]

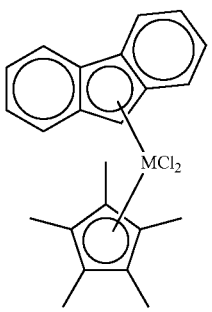

[Formula 1-17]

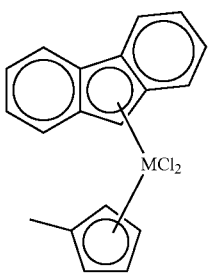

[Formula 1-18]

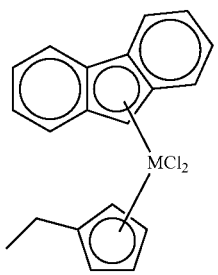

[Formula 1-19]

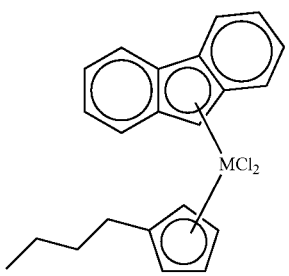

In the transition metal compounds, M is a group 4 transition metal of the periodic table of the elements, for example, hafnium (Hf), zirconium (Zr), or titanium (Ti), and Me is a methyl group.

The second metallocene compound, which is a transition metal compound according to the present invention, may be represented by Formula 2 below.

The second metallocene compound serves to exhibit a high mixing rate of a comonomer at the hybrid supported catalyst, and serves to improve mechanical properties of the prepared polymer.

The second metallocene compound has a high mixing rate of a comonomer and has characteristics of forming a high-molecular-weight body and concentrating the distribution of a comonomer in the high-molecular-weight body, thereby improving impact strength, flexural strength, environmental stress cracking resistance, and melt tension. In addition, the second metallocene compound forms a long chain branched structure to improve the melt flowability of the high-density ethylene-based polymer having a high molecular weight.

Since the second metallocene compound has a symmetric or asymmetric structure and a bridge structure having various ligands, the second metallocene compound forms a steric hindrance such that the comonomer easily approaches a catalytic active site. Therefore, the second metallocene serves to increase the mixing of the comonomer.

[Formula 2]

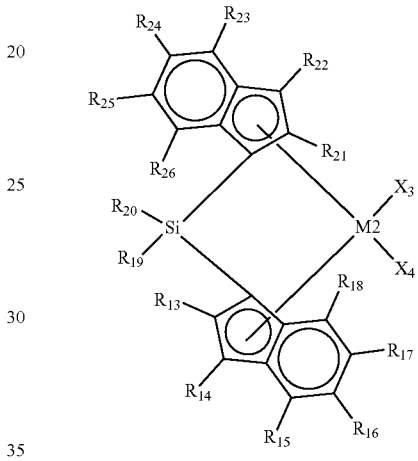

In Formula 2, M2 may be a group 4 transition metal of the periodic table of the elements, $X_3$ and $X_4$ may each independently be one of halogen atoms, $R_{13}$ to $R_{18}$ may each independently be a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and may be linked to each other to form a ring, $R_{21}$ to $R_{26}$ may each independently be a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and may be linked to each other to form a ring, $R_{19}$ and $R_{20}$ may each independently be a substituted or unsubstituted $C_1$-$C_{20}$ alkyl group and may be linked to each other to form a ring, indene linked to $R_{13}$ to $R_{18}$ and indene linked to $R_{21}$ to $R_{26}$ may have the same structure or different structures, and indene linked to $R_{13}$ to $R_{18}$ and indene linked to $R_{21}$ to $R_{26}$ may be linked to Si to form a bridge structure.

In the present invention, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group, unless otherwise specified. In addition, the term "hydrocarbon group" means a linear, branched, or cyclic saturated or unsaturated hydrocarbon group, unless otherwise specified, and the alkyl group, the alkenyl group, the alkynyl group, and the like may be linear, branched, or cyclic.

In a specific example, examples of the transition metal compound represented by Formula 2 include transition metal compounds having the following structures and mixtures thereof, but the present invention is not limited thereto.

[Formula 2-1]
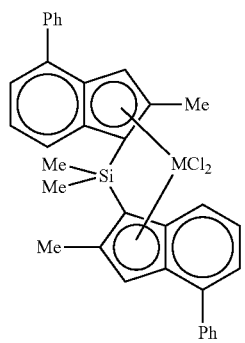
[Formula 2-2]
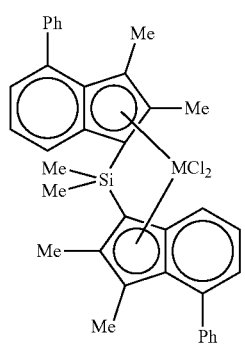
[Formula 2-3]
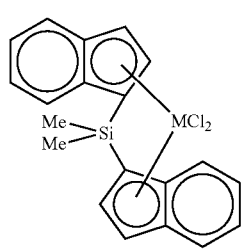
[Formula 2-4]
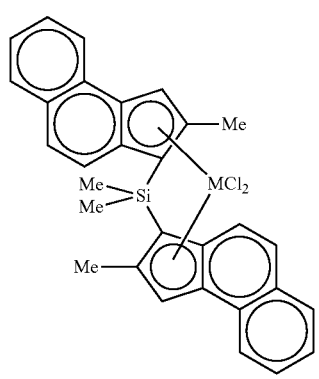
[Formula 2-5]
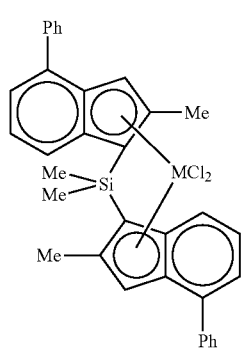
[Formula 2-6]
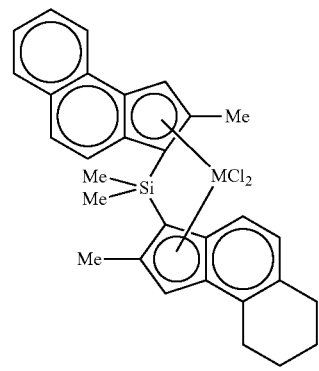
[Formula 2-7]
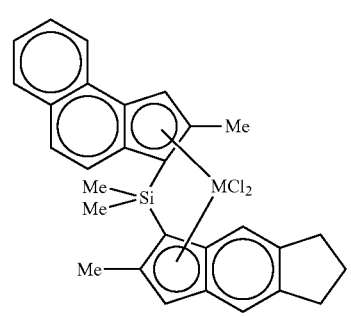
[Formula 2-8]
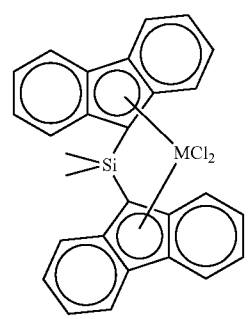
[Formula 2-9]
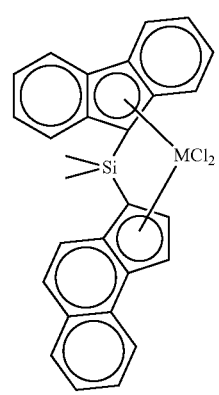

[Formula 2-10]
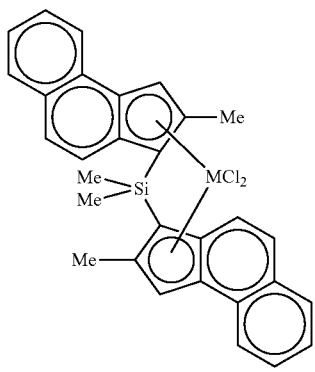
[Formula 2-11]
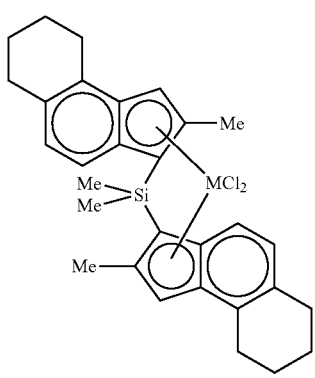
[Formula 2-12]
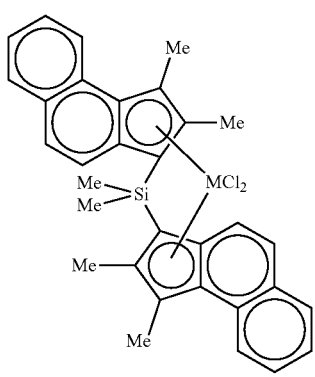
[Formula 2-13]
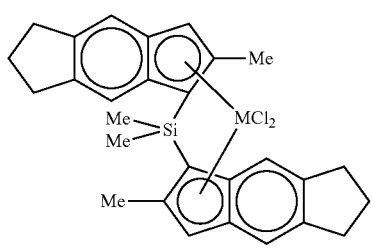
[Formula 2-14]
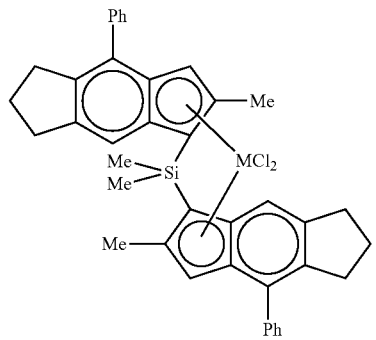
[Formula 2-15]
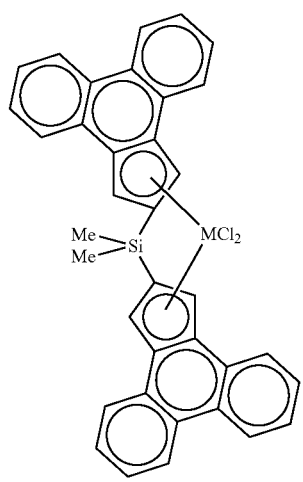
[Formula 2-16]
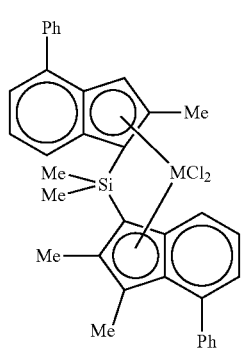
[Formula 2-17]
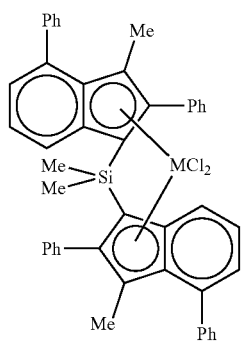

[Formula 2-18]
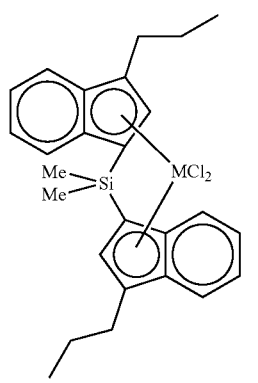
[Formula 2-19]
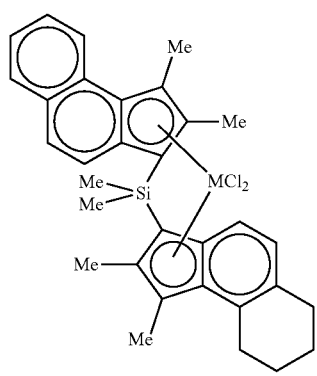
[Formula 2-20]
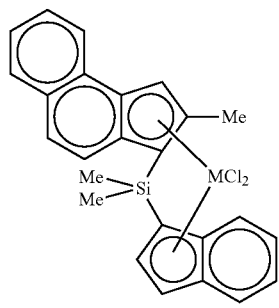
[Formula 2-21]
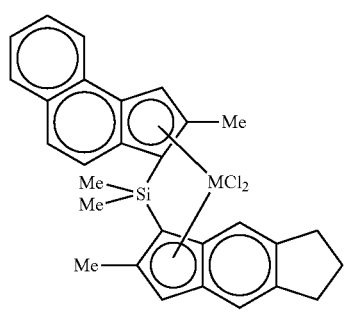
[Formula 2-22]
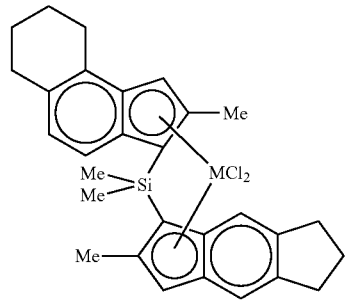
[Formula 2-23]
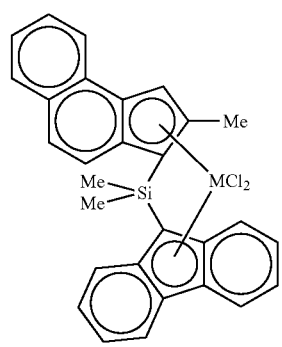
[Formula 2-24]
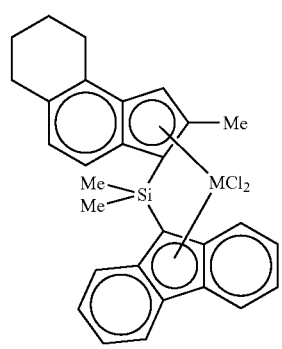
[Formula 2-25]
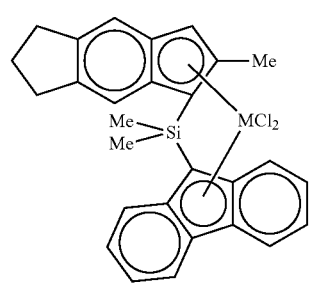
[Formula 2-26]
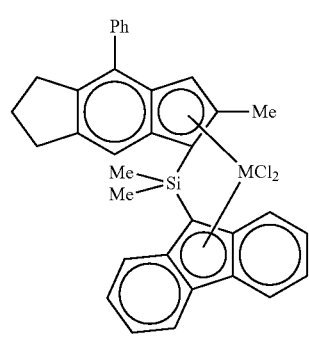

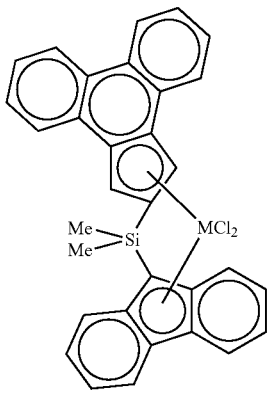
[Formula 2-27]

In the transition metal compounds, M is a group 4 transition metal of the periodic table of the elements, for example, hafnium (Hf), zirconium (Zr), or titanium (Ti), Me is a methyl group, and Ph is a phenyl group.

The catalyst composition according to the present invention may include a cocatalyst compound containing at least one compound selected from the group consisting of the transition metal compound and the compounds represented by Formulae 3 to 6.

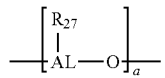
[Formula 3]

In Formula 3, AL is aluminum, $R_{27}$ is a halogen atom, a $C_1$-$C_{20}$ hydrocarbon group, or a $C_1$-$C_{20}$ hydrocarbon group substituted with a halogen atom, and a is an integer of 2 or more and a compound having a repeating unit.

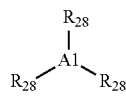
[Formula 4]

In Formula 4, AL is aluminum or boron, $R_{28}$ is a halogen atom, a $C_1$-$C_{20}$ hydrocarbon group, a $C_1$-$C_{20}$ hydrocarbon group substituted with halogen, or a $C_1$-$C_{20}$ alkoxy group.

[L1-H]$^+$[Z1(A2)$_4$]$^-$  [Formula 5]

[L2]$^+$[Z2(A3)$_4$]$^-$  [Formula 6]

In Formulae 5 and 6, L1 and L2 are neutral or cationic Lewis acids, Z1 and Z2 are group 13 elements of the periodic table of the elements, and A2 and A3 are a substituted or unsubstituted $C_6$-$C_{20}$ aryl group or a substituted or unsubstituted $C_1$-$C_{20}$ alkyl group.

The compound represented by Formula 3 is aluminoxane and is not particularly limited as long as the compound is general alkylaluminoxane. For example, methylaluminoxane, ethylaluminoxane, isobutylaluminoxane, butylaluminoxane, and the like may be used. Specifically, methylaluminoxane may be used. The alkylaluminoxane may be prepared by a general method, such as a method of adding an appropriate amount of water to trialkylaluminum or a method of reacting trialkylaluminum with a hydrocarbon compound or an inorganic hydrate salt including water. Generally, the alkylaluminoxane is obtained in the form of a mixture of linear and cyclic aluminoxanes.

As the compound represented by Formula 4, for example, a general alkyl metal compound may be used. Specific examples of the compound represented by Formula 4 include trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and tripentafluorophenylboron. More specific examples of the compound represented by Formula 4 include trimethylaluminum, triisobutylaluminum, and tripentafluorophenylboron.

Examples of the compound represented by Formula 5 or 6 include methyldioctadecylammonium tetrakis(pentafluorophenyl)borate ([HNMe(C18H37)2]+[B(C6F5)4]−), trimethylammonium tetrakis(phenyl)borate, triethylammonium tetrakis(phenyl)borate, tripropylammonium tetrakis(phenyl)borate, tributylammonium tetrakis(phenyl)borate, trimethylammonium tetrakis(p-tolyl)borate, tripropylammonium tetrakis(p-tolyl)borate, trimethylammonium tetrakis(o,p-dimethylphenyl)borate, triethylammonium tetrakis(o,p-dimethylphenyl)borate, trimethylammonium tetrakis(p-trifluoromethylphenyl)borate, tributylammonium tetrakis(p-trifluoromethylphenyl)borate, tributylammonium tetrakis(pentafluorophenyl)borate, diethylammonium tetrakis(pentafluorophenyl)borate, triphenylphosphonium tetrakis(phenyl)borate, trimethylphosphonium tetrakis(phenyl)borate, N,N-diethylanilinium tetrakis(phenyl)borate, N,N-dimethylanilinium tetrakis(pentafluorophenyl)borate, N,N-diethylanilinium tetrakis(pentafluorophenyl)borate, triphenylcarbonium tetrakis(p-trifluoromethylphenyl)borate, triphenylcarbenium tetrakis(pentafluorophenyl)borate, trimethylammonium tetrakis(phenyl)aluminate, triethylammonium tetrakis(phenyl)aluminate, tripropylammonium tetrakis(phenyl)aluminate, tributylammonium tetrakis(phenyl)aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl)aluminate, tributylammonium tetrakis(pentafluorophenyl)aluminate, N,N-diethylanilinium tetrakis(phenyl)aluminate, N,N-diethylanilinium tetrakis(phenyl)aluminate, N,N-diethylanilinium tetrakis(pentafluorophenyl)aluminate, diethylammonium tetrakis(pentafluorophenyl)aluminate, triphenylphosphonium tetrakis(phenyl)aluminate, trimethylphosphonium tetrakis(phenyl)aluminate, triethylammonium tetrakis(phenyl)aluminate, and tributylammonium tetrakis(phenyl)aluminate, but the present invention is not limited thereto. Specifically, methyldioctadecylammonium tetrakis(pentafluorophenyl)borate ([HNMe(C18H37)2]+[B(C6F5)4]−), N,N-dimethylanilinium tetrakis(pentafluorophenyl)borate, and triphenylcarbenium tetrakis(pentafluorophenyl)borate may be used.

In the preparation of the hybrid supported metallocene catalyst according to the present invention, a mass ratio of the transition metal (M1 of Formula 1 and M2 of Formula 2) to the carrier in the first and second metallocene compounds is preferably 1:1 to 1:1,000. The mass ratio may be preferably 1:100 to 1:500. When the carrier and the metallocene compound are contained at the above-described mass ratio, appropriate supported catalyst activity is exhibited, which is advantageous in maintaining the activity of the catalyst and achieving cost reduction.

In addition, a mass ratio of the cocatalyst compound represented by Formulae 5 and 6 to the carrier is preferably 1:20 to 20:1, and the mass ratio of the cocatalyst compound represented by Formulae 3 and 4 to the carrier is preferably 1:100 to 100:1.

The mass ratio of the first metallocene compound to the second metallocene compound is preferably 1:100 to 100:1. When the cocatalyst and the metallocene compound are contained at the above-described mass ratio, it is advantageous in maintaining the activity of the catalyst and achieving cost reduction.

As a carrier suitable for the preparation of the hybrid supported metallocene catalyst according to the present invention, a porous material having a large surface area may be used.

The first and second metallocene compounds and the cocatalyst compound may be a supported catalyst that is hybrid-supported on the carrier and used as the catalyst. The supported catalyst means a catalyst that is well dispersed so as to improve catalyst activity and maintain stability and is supported on a carrier for stable maintenance.

The hybrid support refers to not supporting the first and second metallocene compounds on the carriers but supporting the catalyst compound on the carrier in one step. Due to the reduction in preparing time and the reduction in amount of a solvent used, the hybrid support may be said to be much more cost-effective than individual supports.

The carrier is a solid that disperses and stably retains a material having a catalytic function, and is usually a material having a large porosity or a large area so as to be highly dispersed and supported so as to increase the exposed surface area of the material having the catalytic function. The carrier should be stable mechanically, thermally, and chemically. Examples of the carrier include silica, alumina, titanium oxide, zeolite, zinc oxide, starch, and synthetic polymer, but the present invention is not limited thereto.

The carrier may have an average particle size of 10 microns to 250 microns, preferably 10 microns to 150 microns, and more preferably 20 microns to 100 microns.

The carrier may have a microporous volume of 0.1 cc/g to 10 cc/g, preferably 0.5 cc/g to 5 cc/g, and more preferably 1.0 cc/g to 3.0 cc/g.

In addition, the carrier may have a specific surface area of 1 $m^2/g$ to 1,000 $m^2/g$, preferably 100 $m^2/g$ to 800 $m^2/g$, and more preferably 200 $m^2/g$ to 600 $m^2/g$.

When the carrier is silica, silica may have a drying temperature of 200° C. to 900° C. The drying temperature may be preferably 300° C. to 800° C., and more preferably 400° C. to 700° C. When the drying temperature is less than 200° C., too much moisture causes surface moisture to react with the cocatalyst. When the drying temperature exceeds 900° C., the structure of the catalyst collapses. The concentration of the hydroxyl group in the dried silica may be 0.1 mmol/g to 5 mmol/g, preferably from 0.7 mmol/g to 4 mmol/g, and more preferably 1.0 mmol/g to 2 mmol/g. When the concentration of the hydroxyl group is less than 0.5 mmol/g, a supported amount of the cocatalyst is lowered. When the concentration of the hydroxyl group exceeds 5 mmol/g, the catalyst component is deactivated, which is not preferable.

The hybrid supported metallocene catalyst according to the present invention may be prepared by activating the metallocene catalyst and supporting the activated metallocene catalyst on the carrier. In the preparation of the hybrid supported metallocene, the cocatalyst may be first supported on the carrier. The activation of the metallocene catalyst may be independently performed and may vary depending on the situation. That is, the first metallocene compound and the second metallocene compound may be mixed, activated, and then supported on the carrier. The first metallocene compound and the second metallocene compound may be supported after the cocatalyst compound is supported on the carrier.

Examples of the solvent of the reaction in the preparation of the hybrid supported metallocene catalyst include an aliphatic hydrocarbon solvent such as hexane or pentane, an aromatic hydrocarbon solvent such as toluene or benzene, a hydrocarbon solvent substituted with a chlorine atom, such as dichloromethane, an ether-based solvent such as diethyl ether or tetrahydrofuran, and most organic solvents such as acetone or ethyl acetate. Toluene or hexane is preferable, but the present invention is not limited thereto.

The reaction temperature in the preparation of the catalyst is 0° C. to 100° C., and preferably 25° C. to 70° C., but the present invention is not limited thereto.

The reaction time in the preparation of the catalyst is 3 minutes to 48 hours, and preferably 5 minutes to 24 hours, but the present invention is not limited thereto.

The activation of the metallocene compound may be prepared by mixing (contacting) the cocatalyst compound. The mixing may be performed in an inert atmosphere, typically nitrogen or argon, without using a solvent, or in the presence of the hydrocarbon solvent.

The temperature in the activation of the first and second metallocene compounds may be 0° C. to 100° C., and preferably 10° C. to 30° C.

When the first and second metallocene compounds are activated with the cocatalyst compound, the stirring time may be 5 minutes to 24 hours, and preferably 30 minutes to 3 hours.

In the metallocene compound, the catalyst composition in a solution state, which is uniformly dissolved in the hydrocarbon solvent or the like, is used as it is. Alternatively, the metallocene compound may be used in a solid powder state in which the solvent is removed. However, the present invention is not limited thereto.

The method for preparing the high-density ethylene-based polymer according to the present invention includes preparing a polyolefin homopolymer or copolymer by contacting the hybrid supported metallocene catalyst with at least one olefin monomer.

The method (polymerization reaction) for preparing the high-density ethylene-based polymer according to the present invention may be a slurry phase or gas phase polymerization reaction. In addition, the respective polymerization reaction conditions may be variously modified according to the desired polymerization result of the polymerization method (slurry phase polymerization, gas phase polymerization) or the form of the polymer. The degree of the modification thereof may be easily performed by those of ordinary skill in the art.

When the polymerization is performed in a liquid phase or a slurry phase, a solvent or olefin itself may be used as a medium. Examples of the solvent may include propane, butane, pentane, hexane, octane, decane, dodecane, cyclopentane, methylcyclopentane, cyclohexane, methylcyclohexane, benzene, toluene, xylene, dichloromethane, chloroethane, dichloroethane, and chlorobenzene, and these solvents may be mixed at a predetermined ratio, but the present invention is not limited thereto.

In a specific example, examples of the olefin monomer may include ethylene, α-olefins, cyclic olefins, dienes, trienes, and styrenes, but the present invention is not limited thereto.

The α-olefins include a $C_3$-$C_{12}$ (for example, $C_3$-$C_8$) aliphatic olefin. Specific examples of the α-olefins may include propylene, 1-butene, 1-pentene, 3-methyl-1-butene, 1-hexene, 4-methyl-1-pentene, 3-methyl-1-pentene, 1-hexene, 1-heptene, 1-octene, 1-decene, 1-1-undecene, 1-dodecene, 1-tetradecene, 1-hexadecene, 1-aitosen, 4,4-dimethyl-1-pentene, 4,4-diethyl-1-hexene, and 3,4-dimethyl-1-hexene.

The α-olefins may be homopolymerized, or two or more olefins may be alternating, random, or block copolymerized. The copolymerization of the α-olefins may include copolymerization of ethylene and a $C_3$-$C_{12}$ (for example, $C_3$-$C_8$) α-olefin (specifically, ethylene and propylene, ethylene and 1-butene, ethylene and 1-hexene, ethylene and 4-methyl-1-pentene, ethylene and 1-octene, or the like) and copolymerization of propylene and a $C_4$-$C_{12}$ (for example, $C_4$-$C_8$) α-olefins (specifically, propylene and 1-butene, propylene and 4-methyl-1-pentene, propylene and 4-methyl-butene, propylene and 1-hexene, propylene and 1-octene, or the like). In the copolymerization of ethylene or propylene and another α-olefin, the amount of the other α-olefin may be 99 mol % or less of the total monomer, and preferably 80 mol % or less in the case of the ethylene copolymer.

Preferable examples of the olefin monomer may include ethylene, propylene, 1-butene, 1-hexene, 1-octene, 1-decene, or mixtures thereof, but the present invention is not limited thereto.

In the method for preparing the high-density ethylene-based polymer according to the present invention, the amount of the catalyst composition used is not particularly limited. For example, in the polymerization reaction system, the central metal (M, group 4 transition metal) represented by Formulae 1 and 2 may have a concentration of $1*10^{-5}$ mol/l to $9*10^{-5}$ mol/l. In addition, the temperature and pressure at the time of polymerization may be changed according to the reactant, the reaction condition, and the like, and are thus not particularly limited. However, in the case of the solution polymerization, the polymerization temperature may be 0° C. to 200° C., and preferably 100° C. to 180° C., and in the case of the slurry phase or gas phase polymerization, the polymerization temperature may be 0° C. to 120° C., and preferably 60° C. to 100° C. In addition, the polymerization pressure may be 1 bar to 150 bar, preferably 30 bar to 90 bar, and more preferably 10 bar to 20 bar. The pressure may be applied by injecting an olefin monomer gas (for example, ethylene gas).

For example, the polymerization may be performed in a batch, semi-continuous, or continuous manner. The polymerization may also be performed in two or more steps having different reaction conditions, and the molecular weight of the final polymer may be controlled by changing the polymerization temperature or injecting hydrogen into a reactor.

The high-density ethylene-based polymer according to the present invention may be obtained by homopolymerization of ethylene or copolymerization of ethylene and α-olefin using the hybrid supported metallocene compound as a catalyst, and has a unimodal molecular weight distribution.

Hereinafter, the high-density ethylene-based polymer according to the present invention will be specifically described.

The high-density ethylene-based polymer according to the present invention may have a density of 0.940 g/cm³ to 0.970 g/cm³, and more preferably 0.950 g/cm³ to 0.965 g/cm³. When the density of the polymer is 0.940 g/cm³ or less, the polymer may not exhibit sufficiently high toughness. When the density of the polymer is 0.970 g/cm³ or more, it is not preferable since the degree of crystallization becomes excessively large and brittle fracture easily occurs in a molded product.

Generally, when a melt index (MI) increases, moldability is improved, but impact resistance is deteriorated. For this reason, in the case of increasing the MI so as to improve the moldability, a method is used which forms a short chain branched structure (reduction in density) through general copolymerization so as to prevent deterioration of impact resistance. However, since the reduction in density of ethylene leads to deterioration of the toughness of the polymer, there is a limitation in application due to the reduction in density. When the MI is lowered, impact resistance and chemical resistance are improved, but melt flowability is deteriorated and moldability is significantly deteriorated. In contrast, the high-density ethylene-based polymer according to the present invention has a low MI and thus exhibits excellent impact resistance and chemical resistance, unlike a conventional high-density ethylene-based polymer. In addition, the high-density ethylene-based polymer according to the present invention has a wide molecular weight distribution and a long chain branching, and thus exhibits excellent injection moldability.

The melt flowability used herein mainly corresponds to an extrusion load at the time of extruding a molten resin from an extruder, and MI, MFI, MFR, or the like is used as an index for the standard of the melt flowability. In the present invention, the MI (melt index) indicates flowability in a load of 2.16 kg at 190° C., and the MFI indicates flowability in a load of 21.6 kg at 190° C. The MFR indicates a ratio of MFI to MI, that is, MFI/MI.

The high-density ethylene-based polymer according to the present invention may have an MI of 0.1 g to 50 g/10 min, and preferably 0.5 g to 10 g/10 min. When the MI is 0.1 g/10 min or less, molding processability is significantly deteriorated when the polymer is used as an injection molding material, and the appearance of the injection product is poor. When the MI is greater than 50 g/10 min, the impact resistance is significantly lowered.

The high-density ethylene-based polymer according to the present invention may have an MFR of 35 to 100, and more preferably 37 to 80. When the MFR is 35 or less, molding processability is significantly deteriorated when the polymer is used as an injection molding material. If the MFR is 100 or more, mechanical properties are deteriorated.

The high-density polyethylene polymer according to the present invention is characterized by having an MFR satisfying Equation 1 below.

$$-10.11\ln(MI)+51.744>MFR>-12.25\ln(MI)+65.457 \quad \text{[Equation 1]}$$

The high-density ethylene-based polymer according to the present invention may have an Izod impact strength of 4 kJ/m² to 30 kJ/m², and more preferably 5 kJ/m² to 28 kJ/m². When the Izod impact strength is 4 kJ/m² or less, the strength of the molded product is adversely affected. When the Izod impact strength is 30 kJ/m² or more, the processability of the molded product is adversely affected.

The high-density ethylene-based polymer according to the present invention is characterized by having Izod impact strength satisfying Equation 2 below.

$$93.655\ln(MFR)-332.52>\text{Izod impact strength}>39.395\ln(MFR)+140.74 \quad \text{[Equation 2]}$$

The Izod impact strength is measured by fixing one side of a sample, making the sample stand, and striking the top portion of the sample. A material, the impact strength of which you want to know, is destroyed by applying impact thereto, and absorption energy is measured to obtain the impact strength. In addition, the durability for impact may be known.

The hybrid supported metallocene catalyst according to the present invention exhibits excellent catalytic activity. When the olefin polymer is prepared by using the hybrid supported metallocene catalyst according to the present invention, it is possible to prepare a polymer which has a wide molecular weight distribution and in which a comonomer is concentrated in a high-molecular-weight body. Since the olefin polymer has excellent impact strength, flexural strength, environmental stress cracking resistance, and melt tension, the olefin polymer may be used for a blow molded product, an injection molded product, a film, a pipe, and an extrusion molded product.

Figure 2:
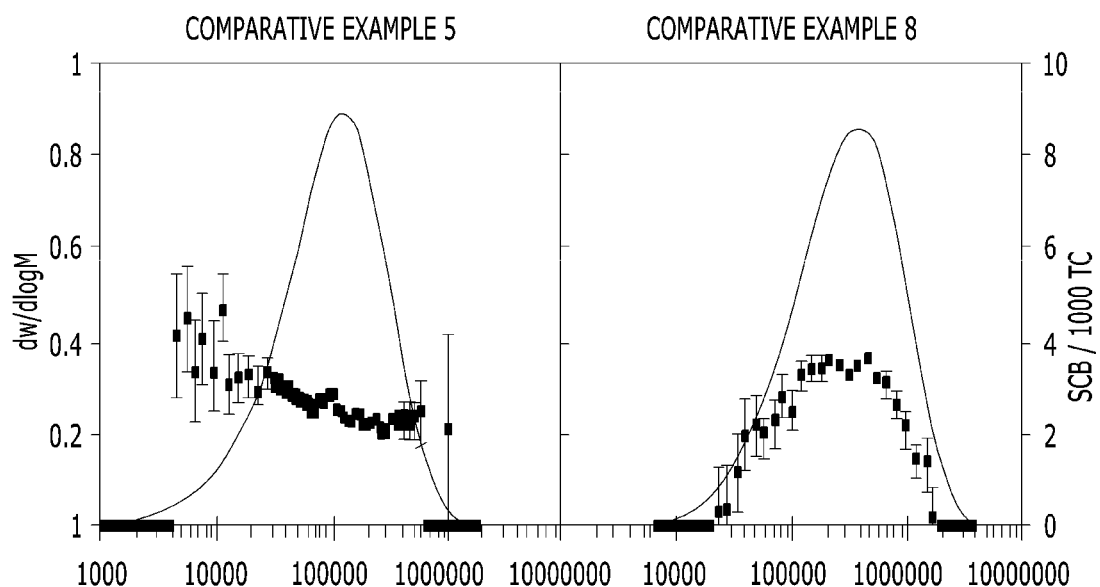
FIG. 2 is a graph showing GPC-IR analysis for confirming a comonomer distribution with respect to copolymers prepared in Examples 5 and 8.

FIG. 1 is a graph showing GPC-IR analysis for confirming a comonomer distribution with respect to copolymers prepared in Examples 3, 4, and 8, and FIG. 2 is a graph showing GPC-IR analysis for confirming a comonomer distribution with respect to copolymers prepared in Comparative Examples 5 and 8.

It is confirmed that the high-density polyethylene copolymer according to the present invention contains a large amount of comonomer in the high-molecular-weight body and thus exhibits excellent environmental stress cracking resistance and excellent impact strength. Generally, when the MI is low, the mechanical properties may be improved, but the melt flowability is deteriorated and the processability is deteriorated. However, it is confirmed that the high-density ethylene-based polymer according to the present invention has a low MI and thus has excellent mechanical properties, and includes a long chain branching and thus exhibits a high MFR, thereby providing excellent processability.

With regard to the rheological properties of the present invention, the stress (stress according to strain) may be 600,000 dyn/cm$^2$ to 1,000,000 dyn/cm$^2$ at an elongation of 1 (1/s) and a Hencky strain of 2.5, which is distinctly different from the following comparative examples.

Figure 3:
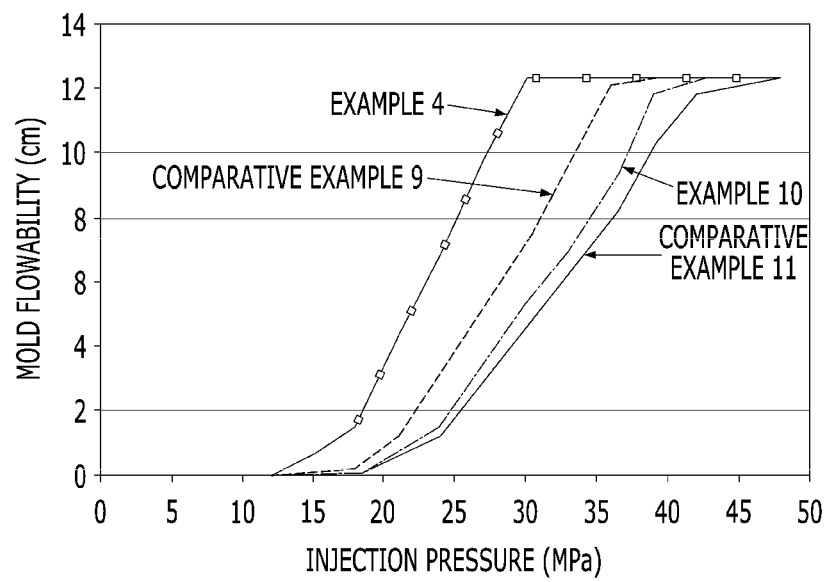
FIG. 3 shows comparison of injection moldability between a copolymer prepared in Example 4 and Comparative Examples 9 to 11 according to a pressure.

FIG. 3 shows comparison of injection moldability between a copolymer prepared in Example 4 and commercial products according to a pressure. A polymer is put into a mold at a temperature of 200° C. to 220° C. for 10 seconds, and it is shown that processability is excellent as a filled sample length becomes longer.

Figure 4:
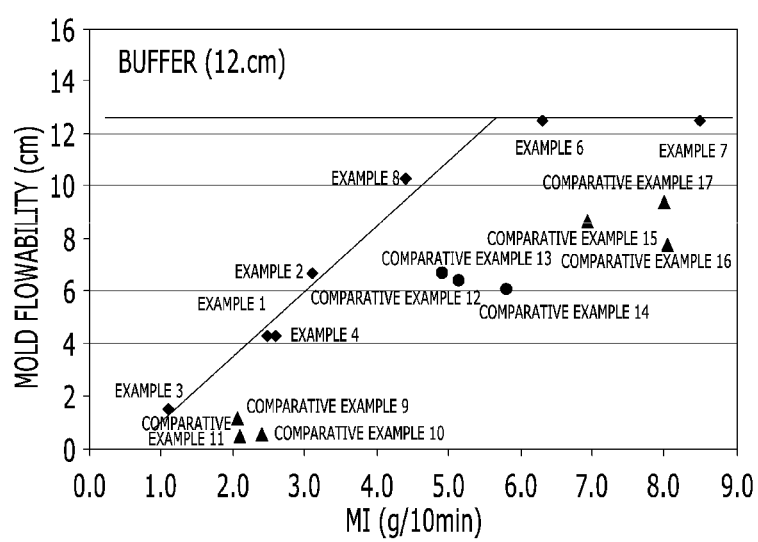
FIG. 4 shows comparison of injection moldability between copolymers prepared in Examples 1, 2, 3, 4, 6, 7, and 8 and Comparative Examples 9 to 17 according to an MI.

FIG. 4 shows comparison of processability between copolymers prepared in Examples 1, 2, 3, 4, 6, 7 and 8 and commercial products according to an MI. A polymer is filled at a temperature of 200° C. to 220° C. for 10 seconds at a pressure of 21 bar, and it is shown that processability is excellent as a filled sample length becomes longer.

Figure 5:
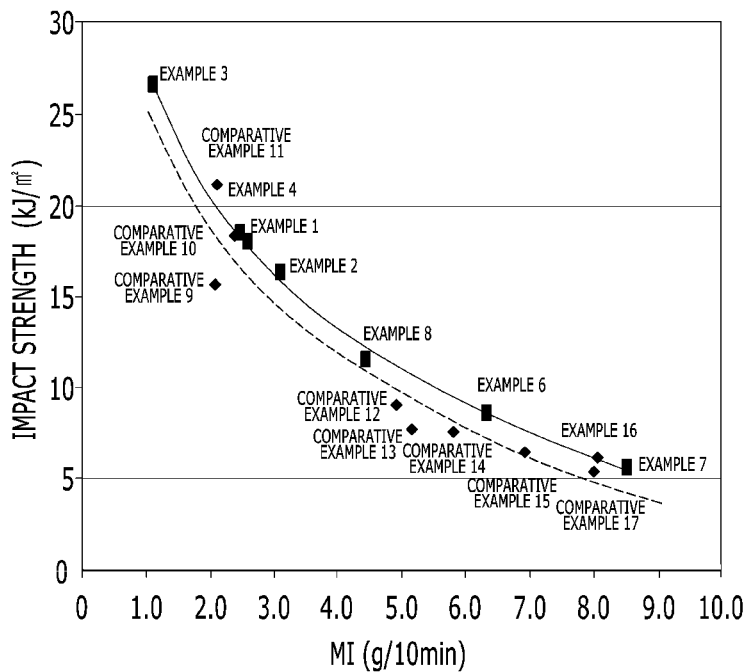
FIG. 5 shows comparison of impact strength between copolymers prepared in Examples 1, 2, 3, 4, 6, 7, and 8 and Comparative Examples 9 to 17 according to an MI.

FIG. 5 shows comparison of impact strength between copolymers prepared in Examples 1, 2, 3, 4, 6, 7 and 8 and commercial products according to an MI.

Figure 6:
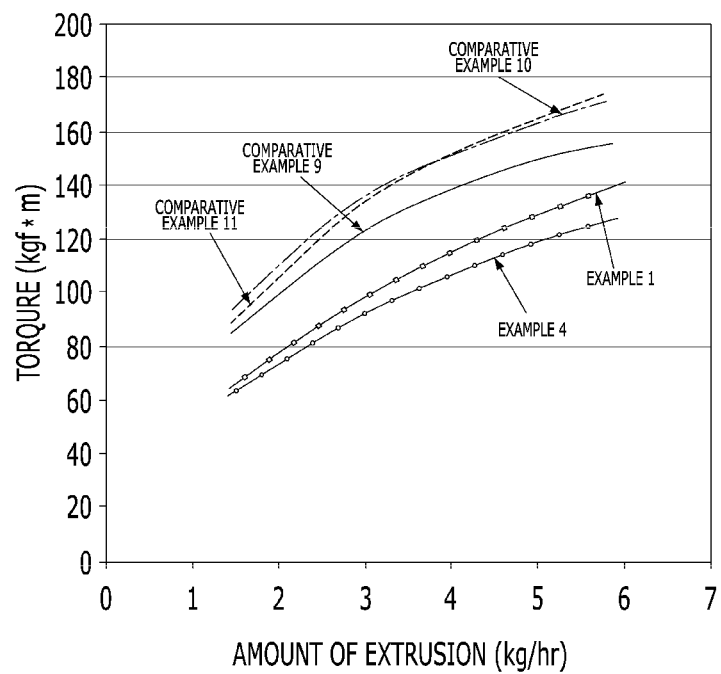
FIG. 6 shows comparison of processability between copolymers prepared in Examples 1 and 4 and Comparative Examples 9 to 11.

FIG. 6 shows comparison of processability between copolymers prepared in Examples 1 and 4 and commercial products. Generally, the MI is increased or the molecular weight distribution is widened, so as to improve processability. Due to this, the viscosity of the resin is lowered at the time of processing, and a low load is formed on a screw at the time of pressure molding, thereby enabling high-speed production. However, if the MI is increased or the molecular weight distribution is widened, there is a problem that the mechanical strength of the polymer is lowered. However, referring to FIG. 6, the high-density ethylene-based copolymer according to the present invention may form a low load while maintaining physical properties such as mechanical strength, as compared with the conventional commercial products. Therefore, it can be confirmed that high-speed production is possible.

Figure 7:
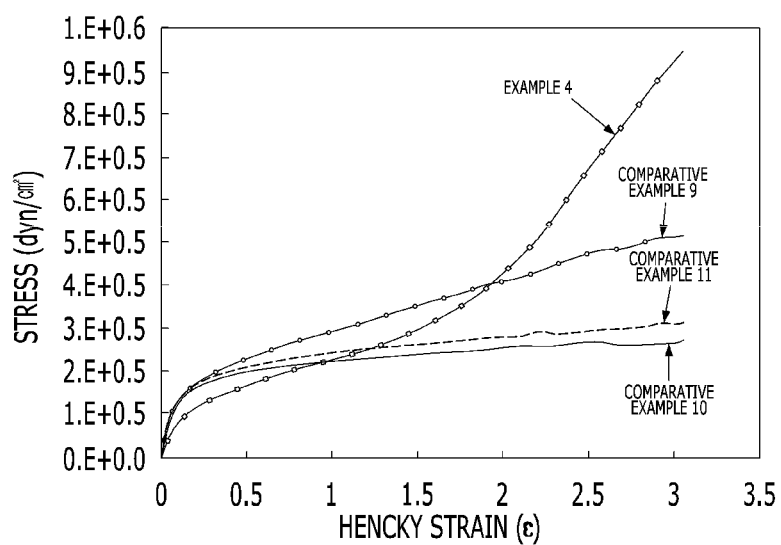
FIG. 7 shows comparison of rheological properties between a copolymer prepared in Example 4 and Comparative Examples 9 to 11.

FIG. 7 shows comparison of rheological properties between a copolymer prepared in Example 4 and commercial products. FIG. 7 shows that a lot of long chain branching exist as a stress value according to Hencky strain increases. Generally, if the long chain branching is included, impact strength is deteriorated. However, referring to FIG. 5 and Tables 1 and 2 below, it can be confirmed that the high-density ethylene-based polymer according to the present invention exhibits excellent impact strength even when the polymer contains a long chain branching.

The rheological properties are physical properties related to a material's flow and deformation. The flow and deformation experienced by the material in the product production process have a decisive influence on the characteristics of the product. The unique properties appearing when the material undergoes the flow and deformation are the rheological properties. A method for measuring the rheological properties obtains a material function by measuring stress appearing when strain is applied.

FIG. 7 shows a graph of the stress when Hencky strain that is the unit of strain is increasing. The stress in Example 4 of the present invention is 670,000 dyn/cm$^2$ at an elongation of 1 (1/s) and a Hencky strain of 2.5, which is distinctly different from the comparative examples.

EXAMPLES

Hereinafter, the structure and operation of the present invention will be described in more detail with reference to preferred examples of the present invention. However, these examples are shown by way of illustration and should not be construed as limiting the present invention in any way.

Since contents not described herein can be sufficiently technically inferred by those of ordinary skill in the art, descriptions thereof will be omitted.

Preparation Example 1 of First Metallocene Compound. [Indenyl(cyclopentadienyl)]ZrCl$_2$ Indene (5 g, 0.043 mol) was dissolved in hexane (150 mL). The mixture was sufficiently mixed and then cooled to a temperature of −30° C. 2.5M n-butyllithium (n-BuLi) hexane solution (17 mL, 0.043 mol) was slowly dropped thereto and stirred at room temperature for 12 hours. A white suspension was filtered through a glass filter, and a white solid was sufficiently dried to obtain an indene lithium salt (yield: 99%).

In a slurry solution of the indene lithium salt (1.05 g, 8.53 mmol), CpZrCl$_3$ (2.24 g, 8.53 mmol) was slowly dissolved in ether (30 mL) and then cooled to a temperature of −30° C. An indene lithium salt dissolved in ether (15 mL) was slowly dropped to the ether solution and stirred for 24 hours to obtain [Indenyl (cyclopentadienyl)]ZrCl$_2$ (yield: 97%). Here, Cp indicates cyclopentadienyl.

Preparation Example 2 of First Metallocene Compound. [2-methyl benzeindenyl (cyclopentadienyl)]ZrCl$_2$

[2-methyl benzeindenyl (cyclopentadienyl)]ZrCl$_2$ (yield: 95%) was obtained in the same manner as in Preparation Example 1 by using 2-methylbenzeindene.

Preparation Example 3 of First Metallocene Compound. [2-phenyl benzeindenyl (tetramethylcyclopentadienyl)]ZrCl$_2$

[2-phenyl benzeindenyl (tetramethylcyclopentadienyl)] ZrCl$_2$ (yield: 93%) was obtained in the same manner as in Preparation Example 1 by using 2-methylbenzeindene and tetrametylcyclopentadiene.

Preparation Example 4 of First Metallocene Compound. [fluorenyl (cyclopentadienyl)]ZrCl$_2$

[2-phenyl benzeindenyl (tetramethylcyclopentadienyl)] ZrCl$_2$ (yield: 92%) was obtained in the same manner as in Preparation Example 1 by using fluorene and cyclopentadiene.

Preparation Example 5 of Second Metallocene Compound. Me$_2$Si(2-methyl-4,5-benzoindenyl)$_2$ZrCl$_2$

Preparation Example 5-1: Preparation of Ligand Compound 2-methylbenzeindene (2.13 g, 1 eq) was added to 30 mL of hexane, and n-BuLi (8.1 mL, 1.1 eq, 1.6 M in hexane) was slowly added thereto at a temperature of −30° C. The mixture was gradually heated to room temperature and stirred for 12 hours. A solid generated therefrom was filtered, washed with hexane, and dried under vacuum to obtain a light gray solid compound.

A dispersion of 15 mL of ether in 5 mL of SiMe$_2$Cl$_2$ (520 mg, 1 eq) ether was slowly added to the gray solid compound, and the mixture was gradually heated to room temperature (25° C.) and stirred for 12 hours. An organic layer was extracted therefrom by using a mixed solution of ether and water, dried, and washed with hexane to obtain (2-methylbenzeindenyl)$_2$SiMe$_2$ (yield: 55%).

Preparation Example 5-2: Preparation of Second Metallocene Compound

The compound (0.4 g, 1 eq) prepared in Preparation Example 5-1 was added to 15 mL of tetrahydrofuran (THF), and n-BuLi (1.32 mL, 2.2 eq, 1.6 M in hexane) was slowly added thereto at a temperature of −30° C. The mixture was gradually heated to room temperature and stirred for 12 hours to obtain dilithium salt. ZrCl$_4$ (435 mg, 1 eq) was slowly added to a dilithium salt slurry solution and stirred for 12 hours. A solvent was removed therefrom under vacuum, and a product obtained therefrom was washed with THF and MC to obtain Me$_2$Si(2-methyl-4,5-benzoindenyl)$_2$ ZrCl$_2$ (yield: 37%).

Preparation Example 6 of Second Metallocene Compound. Me$_2$Si{2-methyl-4-(1-naphthyl)}$_2$ZrCl$_2$

Preparation Example 6-1: Preparation of Ligand Compound 2-methyl-4-bromo indene (2 g, 1 eq), Pd(PPh$_3$)$_4$ (553 mg, 0.05 eq), and 1-NaphB(OH)$_2$ (2.14 g, 1.3 eq) were added to a solution of THF and MeOH (4:1, 40 ml), and degassed K$_2$CO$_3$ aqueous solution (2.0 M, 3.3 eq) was added thereto at room temperature. The mixture was stirred under reflux at a temperature of 80° C. for 12 hours to obtain 2-methyl-4-(1-naphthyl)indene. 2-methyl-4-(1-naphthyl)indene was added to 50 mL of toluene, and n-BuLi (7.8 mL, 1.1 eq, 1.6 M in hexane) was slowly added thereto at a temperature of −30° C. The mixture was gradually heated to room temperature and stirred for 12 hours. A solid generated therefrom was filtered, washed with hexane, and dried under vacuum to obtain 2-methyl-4-(1-naphthyl)indenyl lithium.

SiMe$_2$Cl$_2$ (462 mg, 1 eq) was slowly added to 2-methyl-4-(1-naphthyl)indenyl lithium (1.88 g, 2 eq), 13 mL of toluene, and 3 mL of THF at a temperature of −30° C., and the mixture was gradually heated and stirred at a temperature of 55° C. for 12 hours to obtain 1.97 g (97%) of dimethylbis{2-methyl-4-(1-naphthyl)indenyl}silane.

Preparation Example 6-2: Preparation of Second Metallocene Compound

Me$_2$Si{2-methyl-4-(1-naphthyl)}$_2$ZrCl$_2$ (yield: 94%) was obtained in the same manner as in Preparation Example 5-2 by using dimethylsilylbis{2-methyl-4-(1-naphthyl) indenyl}dilithium.

Preparation Example 7 of Second Metallocene Compound. Me$_2$Si{2-methyl-4-(2-naphthyl)}$_2$ZrCl$_2$

Preparation Example 7-1: Preparation of Ligand Compound

Dimethylbis{2-methyl-4-(2-naphthyl) indenyl)}silane (yield: 51%) was obtained in the same manner as in Preparation Example 5-1 by using 2-methyl-7-(2-naphthyl)indene.

Preparation Example 7-2: Preparation of Second Metallocene Compound

Me$_2$Si{2-methyl-4-(2-naphthyl)}$_2$ZrCl$_2$ (yield: 90%) was obtained in the same manner as in Preparation Example 5-2 by using the compound prepared in Preparation Example 7-1.

Preparation Example 8 of Second Metallocene Compound. (Me$_2$Si(2-methyl-4-phenyl indenyl)$_2$ZrCl$_2$)

Preparation Example 8-1: Preparation of Ligand Compound 2-methyl-4-bromo indene (2 g, 1 eq) and Ni(dppp)Cl$_2$ (363 mg, 0.02 eq) were added to ether (100 mL), and PhMgBr (3.0 M in ether, 13.3 g, 1.05 eq) was added thereto at a temperature of 0° C. for 1 hour. The mixture was gradually heated to room temperature (25° C.) and stirred under reflux at a temperature of 50° C. for 12 hours. After the reaction was completed, the solution was immersed in an ice bath, and 1N HCl was added thereto to lower pH to 4. An organic layer was extracted therefrom with a separatory funnel and treated with MgSO$_4$ to remove water therefrom. The organic layer was filtered and a solvent was dried to obtain 2-methyl-4-(phenyl)indene (yield: 97%). Me$_2$Si(2-methyl-4-phenyl indenyl)$_2$ (yield: 95%) was prepared in the same manner as in Preparation Example 5-1 by using 2-methyl-4-(phenyl)indene. Here, dppp indicates 1,3-bis(diphenylphosphino)propane.

Preparation Example 8-2: Preparation of Second Metallocene Compound

Me2Si(2-methyl-4-phenyl indenyl)2ZrCl2 (yield: 90%) was obtained in the same manner as in Preparation Example 5-2 by using Me2Si(2-methyl-4-phenylindene)2.

Preparation Example 9 of Hybrid Supported Metallocene Catalyst

The first and second metallocene compounds and methylaluminoxane (MAO) as the cocatalyst lost activity when reacting with moisture or oxygen in the air. Therefore, all experiments were performed under a nitrogen condition by using a glove box and a Schlenk technique. A 10 L supported catalyst reactor was washed to remove foreign matter therefrom. The 10 L supported catalyst reactor was closed while drying at a temperature of 110° C. for 3 hours or more, and was then used in a state in which moisture or the like was completely removed using a vacuum.

10 wt % of methylalumoxane (MAO) solution (methylaluminoxane: 1,188 g) was added to 2.862 g of the compound prepared in Preparation Example 1 and 3.469 g of the compound prepared in Preparation Example 8-2, and the mixture was stirred at room temperature for 1 hour. After 300 g of silica (XPO2402) was added to the reactor, 900 mL of purified toluene was added to the reactor and then stirred. After the stirring step for 1 hour was completed, a mixed solution of a first metallocene compound, a second metallocene compound, and methylaluminoxane was added to the reactor while stirring the reactor. The reactor was heated to a temperature of 60° C. and stirred for 2 hours.

After a precipitation reaction, a supernatant was removed, washed with 1 L of toluene, and vacuum-dried at a temperature of 60° C. for 12 hours.

Preparation Example 10 of Hybrid Supported Metallocene Catalyst

A hybrid supported metallocene catalyst was prepared in the same manner as in Preparation Example 9, except that 2.389 g of the compound prepared in Preparation Example 2 and 4.387 g of the compound prepared in Preparation Example 8-2 were used.

Preparation Example 11 of Hybrid Supported Metallocene Catalyst

A hybrid supported metallocene catalyst was prepared in the same manner as in Preparation Example 9, except that 2.712 g of the compound prepared in Preparation Example 3 and 3.046 g of the compound prepared in Preparation Example 7-2 were used.

Preparation Example 12 of Hybrid Supported Metallocene Catalyst

A hybrid supported metallocene catalyst was prepared in the same manner as in Preparation Example 9, except that 2.662 g of the compound prepared in Preparation Example 4 and 3.712 g of the compound prepared in Preparation Example 6-2 were used.

Preparation Example 13 of Hybrid Supported Metallocene Catalyst

A hybrid supported metallocene catalyst was prepared in the same manner as in Preparation Example 9, except that 2.359 g of the compound prepared in Preparation Example 1 and 4.357 g of the compound prepared in Preparation Example 5-2 were used.

Preparation Example 14 of Hybrid Supported Metallocene Catalyst

A hybrid supported metallocene catalyst was prepared in the same manner as in Preparation Example 9, except that 2.329 g of the compound prepared in Preparation Example 4 and 4.357 g of the compound prepared in Preparation Example 8-2 were used.

Preparation Example 15 of Hybrid Supported Metallocene Catalyst

A hybrid supported metallocene catalyst was prepared in the same manner as in Preparation Example 9, except that 2.359 g of the compound prepared in Preparation Example 1 and 4.057 g of the compound prepared in Preparation Example 7-2 were used.

Preparation Example 16 of Hybrid Supported Metallocene Catalyst

A hybrid supported metallocene catalyst was prepared in the same manner as in Preparation Example 9, except that 2.359 g of the compound prepared in Preparation Example 2 and 4.157 g of the compound prepared in Preparation Example 5-2 were used.

Preparation Example 17 of Hybrid Supported Metallocene Catalyst

A hybrid supported metallocene catalyst was prepared in the same manner as in Preparation Example 9, except that 2.159 g of the compound prepared in Preparation Example 2 and 3.357 g of the compound prepared in Preparation Example 6-2 were used.

Preparation Example 18 of Hybrid Supported Metallocene Catalyst

A hybrid supported metallocene catalyst was prepared in the same manner as in Preparation Example 9, except that 2.659 g of the compound prepared in Preparation Example 3 and 4.557 g of the compound prepared in Preparation Example 5-2 were used.

Comparative Example 1 of Catalyst

A catalyst was prepared in the same manner as in Preparation Example 9, except that the compound prepared in Preparation Example 1 and (nBuCp)$_2$ZrCl$_2$ were used.

Comparative Example 2 of Catalyst

A catalyst was prepared in the same manner as in Preparation Example 9, except that the compound prepared in Preparation Example 8-2 and (nBuCp)$_2$ZrCl$_2$ were used.

Comparative Example 3 of Catalyst

A catalyst was prepared in the same manner as in Preparation Example 9, except that the compound prepared in Preparation Example 1 and $Me_2Si(Me_4Cp)(NtBu)TiCl_2$ were used.

Comparative Example 4 of Catalyst

A catalyst was prepared in the same manner as in Preparation Example 9, except that the compound prepared in Preparation Example 8-2 were used.

Example 1

An olefin polymer was prepared by adding the hybrid supported metallocene catalyst obtained in Preparation Example 9 to a fluidized bed gas process continuous polymerizer. 1-hexene was used as a comonomer, a reactor ethylene pressure was maintained at 15 bar, and a polymerization temperature was maintained at 80° C. to 90° C.

Examples 2 to 10

Olefin polymers were prepared in the same manner as in Example 1, except that the hybrid supported metallocene catalyst prepared in Preparation Examples 10 to 18 were used.

Comparative Examples 5 to 8

Olefin polymers were prepared in the same manner as in Example 1, except that the hybrid supported metallocene catalyst prepared in Comparative Examples 1 to 4 were used.

<Physical Property Measurement Method>
1) A density was measured according to ASTM 1505.
2) MI, MFI, and MFR Melt flowability MI was an amount of extrusion for 10 minutes at a load of 2.16 kg, and was measured at a measurement temperature of 190° C. according to ASTM 1238.

MFI was an amount of extrusion for 10 minutes at a load of 21.6 kg, and was measured at a measurement temperature of 190° C. according to ASTM 1238.

MFR indicates a ratio of MFI to MI, that is, MFI/MI.

3) Molecular Weight and Molecular Weight Distribution (PDI)

An average molecular weight was measured by using Gel Permeation Chromatography-FTIR (GPC-FTIR).

4) Izod Impact Strength

Impact strength was measured according to ASTM D256.

5) Environmental Stress Cracking Resistance (ESCR)

Environmental Stress Cracking Resistance (hereinafter, referred to as ESCR) was evaluated, based on the ASTM D1693 standard, when 10 samples were put into a 10% IGEPAL solution at 50° C. and then failure (crack) occurred in 5 samples.

6) Broad Orthogonal Comonomer Distribution Index (BOCDI)

A value indicating a short chain branch (SCB) distribution has a positive value, SCB is more concentrated in a high-molecular-weight body.

7) Evaluation of Resin Moldability (Mold Flowability)

A flexural sample was injection-molded according to the ASTM D790 standard, and processability was evaluated.

<Injection Condition>
Barrel temperature: 200° C. to 220° C., mold temperature: 30° C., injection pressure: 18 bar to 21 bar, filling time: 10 s, cooling time: 20 s, holding pressure: 0 bar, flexural sample buffer length: 12 cm The ASTM is the name of the standard and is divided into 1) definition of common terms in the field, 2) sequence that is considered to be appropriate so as to achieve a given task, 3) method for performing a given measurement, 4) criteria for dividing objects or concepts into groups, 5) determining the range or limitation of characteristics of a product or material.

In addition, the MI, i.e., melt index, is a term indicating melt flowability of a plastic material having a predetermined load at a predetermined temperature. As the melt index is higher, the processability of the polymer is more excellent. The melt index is inversely proportional to the molecular weight. A polyolefin-based resin may be prepared by various molding methods, but these methods are common in that the resin is first heated to a molten state and then molded. Therefore, the melting property is an extremely important physical property in the molding of the polyolefin-based resin. In particular, in the molding such as extrusion molding, compression molding, injection molding, or rotational molding, the melting property, that is, the melt flowability, is an essential property that affects satisfactory moldability. As the melt flow index is larger, the flow becomes easier.

In the present invention, the MI indicates flowability in a load of 2.16 kg at 190° C., and the MFI indicates flowability in a load of 21.6 kg at 190° C. MFR indicates a ratio of MFI to MI, that is, MFI/MI.

In addition, the Izod impact strength is measured by fixing one side of a sample, making the sample stand, and striking the top portion of the sample. A material, the impact strength of which you want to know, is destroyed by applying impact thereto, and absorption energy is measured to obtain the impact strength. In addition, the durability for impact may be known.

In addition, the physical properties of the polymer materials are sensitive to molding conditions or temperature, time, environment, or the like during storage and transportation. In particular, it is difficult to accurately predict a change in physical properties over a long period of time, thus causing unpredictable damage. It is the same as ordinary metal materials that damage occurs in a relatively low stress state in a fatigue or creep environment. However, in the case of the polymer material, cracks may occur in an extremely low stress or strain condition when the polymer material comes in contact with a chemical solvent. Environmental stress cracking caused by external stimulus is a complicated phenomenon including absorption and penetration of solvent, thermodynamics of mixture, cavitation, partial yielding of materials, and the like. In particular, it has been reported that the ratio of the environmental stress cracking to the cause of the damage to the polymer material reaches 15% to 20%, and environmental stress cracking resistance has become an important value of the polymer material.

In the physical property measurement according to the present invention, the measurement of the environmental stress cracking resistance is performed by the above-described method.

In addition, in the physical property measurement according to the present invention, a BOCD index, which is an index for determining whether mechanical strength and chemical resistance are excellent, is measured. BOCD is a term related to a polymer structure of a recently developed new concept. A BOCD structure refers to a structure in which a content of a comonomer such as α-olefin is concentrated in a high-molecular-weight main chain, that is, a structure in which a content of a short chain structure increases toward a higher molecular weight side.

The BOCD index may be obtained by measuring the short chain branching (SCB) content (unit: number/1000C) in the left and right 30% range of the molecular weight distribution (MWD) based on the weight average molecular weight (Mw) as expressed in Equation 3 below.

$$BOCD\ INDEX = \frac{(SCB\ \text{content on high molecular weight side} - SCB\ \text{content on low molecular weight side})}{(SCB\ \text{content on low molecular weight side})} \quad [\text{Equation 3}]$$

When the BOCD index is 0 or less, it is not a polymer having a BOCD structure, and when the BOCD index is greater than 0, it can be regarded as a polymer having a BOCD structure. It can be said that as the value is larger, characteristics of the BOCD are excellent.

The polymerization conditions of Examples 1 to 10 and Comparative Examples 5 to 8 are shown in Table 1.

TABLE 1

|  | Ethylene Pressure (bar) | Hydrogen/ Ethylene Mole Ratio (%) | 1-Hexene/ Ethylene Mole Ratio (%) | Catalyst Activity (gPE/gCat) |
|---|---|---|---|---|
| Example 1 | 15 | 0.125 | 0.159 | 5100 |
| Example 2 | 15.2 | 0.115 | 0.168 | 5000 |
| Example 3 | 14.7 | 0.082 | 0.31 | 4800 |
| Example 4 | 14.4 | 0.101 | 0.161 | 4900 |
| Example 5 | 15 | 0.164 | 0.081 | 4100 |
| Example 6 | 14.1 | 0.808 | 0.29 | 5400 |
| Example 7 | 15.2 | 1.164 | 0.102 | 5200 |
| Example 8 | 15.1 | 0.765 | 0.133 | 5150 |
| Example 9 | 15.2 | 0.118 | 0.12 | 5050 |
| Example 10 | 15.1 | 0.087 | 0.114 | 4930 |
| Comparative Example 5 | 15.1 | 0.027 | 0.21 | 4500 |
| Comparative Example 6 | 15.05 | 0.116 | 0.226 | 2800 |
| Comparative Example 7 | 15.2 | 0.13 | 0.22 | 1100 |
| Comparative Example 8 | 15.1 | 0.218 | 0.13 | 1400 |

Table 2 below shows the above-described physical property measurement data. When compared with the nine commercially available HDPEs (Comparative Examples 9 to 17), it is confirmed that the high-density ethylene-based polymer according to the present invention has excellent melt flowability and excellent mechanical properties.

It is confirmed that the high-density ethylene-based polymer according to the present invention contains a large amount of short chain branching in the high-molecular-weight body and thus exhibits excellent environmental stress cracking resistance and excellent impact strength. Generally, when the MI is low, the mechanical properties may be improved, but the melt flowability is deteriorated and the processability is deteriorated. However, it is confirmed that the high-density ethylene-based polymer according to the present invention has a low MI and thus has excellent mechanical properties, and includes a long chain branching and thus exhibits a high MFR, thereby providing excellent processability. The high-density ethylene-based polymer according to the present invention has a low MI, but exhibits more excellent processability than the conventional HDPE due to high MFR characteristics. The commercially available product used an A product (HDPE: 7303, density: 0.9523 g/cm$^3$, MI: 2.1 g/10 min) as Comparative Example 9, a B product (HDPE: 9100, density: 0.9556 g/cm$^3$, MI: 2.4 g/10 min) as Comparative Example 10, a C product (HDPE: ME2500, density: 0.9538 g/cm$^3$, MI: 2.1 g/10 min) as Comparative Example 11, a D product (HDPE: M850, density: 0.9642 g/cm$^3$, MI: 4.9 g/10 min) as Comparative Example 12, an E product (HDPE: 2200J, density: 0.9582 g/cm$^3$, MI: 5.1 g/10 min) as Comparative Example 13, an F product (HDPE: 7210, density: 0.9581 g/cm$^3$, MI: 6.1 g/10 min) as Comparative Example 14, a G product (HDPE: M680, density: 0.9557 g/cm$^3$, MI: 6.9 g/10 min) as Comparative Example 15, an H product (HDPE: M2210J, density: 0.9582 g/cm$^3$, MI: 8.0 g/10 min) as Comparative Example 16, and an I product (HDPE: ME8000, density: 0.9592 g/cm$^3$, MI: 8.0 g/10 min) as Comparative Example 17.

TABLE 2

|  | Density (g/cm$^3$) | MI (g/10 min) | MFR | BOCDI | ESCR (5 crack occurrence time) | IZOD impact strength (kJ/m$^2$) | Mold Flowability (cm, 18 bar) | Mold flowability (cm, 21 bar) |
|---|---|---|---|---|---|---|---|---|
| Example 1 | 0.9518 | 2.6 | 42.7 | 0.69 | 17 | 18.1 | 1.8 | 4.3 |
| Example 2 | 0.9561 | 3.1 | 44.4 | 0.78 | 12 | 16.4 | 4 | 6.7 |
| Example 3 | 0.9562 | 1.1 | 64 | 0.81 | >37 | 26.6 | 0.7 | 1.5 |
| Example 4 | 0.9559 | 2.5 | 43.6 | 0.47 | 18 | 18.5 | 1.5 | 4.3 |
| Example 5 | 0.9656 | 2.5 | 44 | 0.58 | >21 | 18.4 | 1.4 | 4.2 |
| Example 6 | 0.9563 | 6.3 | 39.7 | 0.39 | 7 | 8.5 | 9.4 | 완충 |
| Example 7 | 0.9582 | 8.3 | 37 | 0.51 | 6 | 5.6 | 완충 | 완충 |
| Example 8 | 0.9572 | 4.4. | 38.8 | 0.68 | 12 | 11.6 | 6.8 | 10.3 |
| Example 9 | 0.9567 | 3.65 | 47.5 | 0.37 | 11 | 12.5 | 5 | 7.1 |
| Example 10 | 0.9736 | 1.2 | 52.9 | 0.48 | >37 | 26.4 | 0.6 | 1.4 |
| Comparative Example 5 | 0.9561 | 0.83 | 16.7 | −0.12 | 1 | 5.7 | 0. | 0.3 |
| Comparative Example 6 | 0.9506 | 0.95 | 21.2 | −0.08 | 2 | 19.5 | 0.5 | 1.2 |
| Comparative Example 7 | 0.9523 | 1.1 | 18 | −0.01 | 2.5 | 18.8 | 0.2 | 1 |

TABLE 2-continued

| | Density (g/cm³) | MI (g/10 min) | MFR | BOCDI | ESCR (5 crack occurrence time) | IZOD impact strength (kJ/m²) | Mold Flowability (cm, 18 bar) | Mold flowability (cm, 21 bar) |
|---|---|---|---|---|---|---|---|---|
| Comparative Example 8 | 0.9537 | 1.09 | 22.3 | −0.01 | 11 | 19.3 | 0 | 0.2 |
| Comparative Example 9 | 0.9523 | 2.1 | 37.4 | — | 9~14 | 15.7 | 0.2 | 1.2 |
| Comparative Example 10 | 0.9556 | 2.4 | 28.5 | — | 9~14 | 21.2 | 0 | 0.5 |
| Comparative Example 11 | 0.9538 | 2.1 | 28.5 | — | 9~14 | 21.2 | 0 | 0.5 |
| Comparative Example 12 | 0.9642 | 4.9 | 34.9 | — | 4 | 9.1 | 4 | 6.7 |
| Comparative Example 13 | 0.9582 | 5.1 | 32.6 | — | 5 | 7.7 | 3.5 | 6.1 |
| Comparative Example 14 | 0.9581 | 6.1 | 30.1 | — | 4 | 5.5 | 3.5 | 6.1 |
| Comparative Example 15 | 0.9557 | 6.9 | 30.4 | — | 5.5 | 6.5 | 5.6 | 8.7 |
| Comparative Example 16 | 0.9582 | 8.0 | 27.6 | — | 4.5 | 6.2 | 5.2 | 7.8 |
| Comparative Example 17 | 0.9592 | 8.0 | 28.5 | — | 2.5 | 5.4 | 5.9 | 9.4 |

It can be seen from FIGS. 1 and 2 and Tables 1 and 2 that the metallocene catalyst prepared by hybrid-supporting the first metallocene of Formula 1 and the second metallocene of Formula 2 exhibits higher activity than the case of Comparative Examples, and thus exhibits excellent cost reduction characteristics. In addition, it was confirmed that the metallocene catalyst had high MFR and thus exhibited excellent injection processability, and the BOCDI was a positive value and thus a lot of short chain branching were distributed in the high-molecular-weight body.

In addition, it was confirmed that, for the same reasons as described above, the high-density ethylene-based polymer prepared by using the hybrid metallocene catalyst according to the present invention had excellent impact strength and excellent environmental stress cracking resistance.

In addition, referring to FIGS. 3 and 4 and Tables 1 and 2, the high-density ethylene-based polymer according to the present invention has a low MI, but exhibits more excellent processability than the conventional HDPE due to high MFR characteristics.

As shown in Table 2, regarding ESCR, it can be confirmed that the time for which five cracks occur is 16 hours to 100 hours when the density of the ethylene-based polymer is 0.950 g/cm³ to 0.960 g/cm³ and the MI is 1.0 g/10 min to 3 g/10 min, is 10 hours to 80 hours when the density of the ethylene-based polymer is 0.950 g/cm³ to 0.965 g/cm³ and the MI is 6.0 g/10 min to 7.0 g/10 min, and is 9 hours to 75 hours when the density of the ethylene-based polymer is 0.955 g/cm³ to 0.960 g/cm³ and the MI is 8.0 g/10 min to 9 g/10 min.

In the preparation of the hybrid supported metallocene, the use of the first metallocene of Formula 1 having the asymmetric structure according to the present invention has characteristics that exhibit more excellent activity than that of Comparative Example 7 having the symmetrical structure.

In the asymmetric structure, an electron donating phenomenon in which electrons are donated to a central metal in a ligand is not the same. Thus, since bond lengths between the central metal and the ligand are different from each other, a steric hindrance received when a monomer approaches a catalystic active site is low. However, in the symmetrical structure, since the same electrons are donated to the central metal, bond lengths between the central metal and the ligand are the same as each other. Thus, since the steric hindrance is higher than that of the asymmetric structure, low activity is exhibited when the high-density polymer is formed.

Comparative Example 6, in which the second metallocene has a structure different from that of Formula 2, exhibits excellent activity characteristics, but is difficult to use commercially because processability is deteriorated, a high-molecular-weight body is low, and a comonomer is concentrated in a low-molecular-weight body so that melt tension and environmental stress cracking resistance are low. Since the second metallocene of Formula 2 has a bridge structure form, the second metallocene protects the catalystic active site and facilitates accessibility of the comonomer to the catalytic active site, thereby providing characteristics in which penetration of comonomer is excellent. In addition, as compared with the non-bridge structure, the catalytic active site is stabilized to form a high molecular weight. However, in the case of the metallocene of Formula 2 alone, activity is excessively low and is thus cost-ineffective, and a high-molecular-weight body is excessively formed and thus processability is deteriorated.

While the present invention has been particularly shown and described with reference to exemplary embodiments thereof, the present invention is not limited to the specific exemplary embodiments. It will be understood by those of ordinary skill in the art that various modifications may be made thereto without departing from the spirit and scope of the present invention as defined by the appended claims, and such modifications fall within the scope of the claims.

The invention claimed is:

1. A high-density ethylene-based polymer prepared by polymerizing ethylene and at least one monomer selected from the group consisting of α-olefin monomers,
wherein a density is 0.940 g/cm³ to 0.970 g/cm³,
a melt index (MI) is 0.1 g/10 min to 10 g/10 min,
a melt flow ratio MFR is 37 to 100 and satisfies Equation 1,
Izod impact strength is 4 kJ/m² to 30 kJ/m² and satisfies Equation 2, a stress is 600,000 dyn/cm² to 1,000,000 dyn/cm² at 150° C., an elongation of 1 (1/s), and a Hencky strain of 2.5,
a broad orthogonal comonomer distribution index (BOCDI) value is 0.1 to 1, and
the high-density ethylene-based polymer has a unimodal molecular weight distribution:

$$-10.11\ln(MI)+51.744 > MFR > -12.25\ln(MI)+65.457 \quad \text{[Equation 1]}$$

$$93.655\ln(MFR)-332.52 > \text{Izod impact strength} > 39.395\ln(MFR)+140.74. \quad \text{[Equation 2]}$$

2. The high-density ethylene-based polymer of claim 1, wherein a time for which five cracks occur in environmental stress cracking resistance measured according to ASTM D1693 in the high-density ethylene-based polymer is 16 hours to 100 hours when the density is 0.950 g/cm³ to 0.960 g/cm³ and the MI is 1.0 g/10 min to 3 g/10 min,
the time is 10 hours to 80 hours when the density is 0.950 g/cm³ to 0.965 g/cm³ and the MI is 6.0 g/10 min to 7.0 g/10 min, and
the time is 9 hours to 75 hours when the density is 0.955 g/cm³ to 0.960 g/cm³ and the MI is 8.0 g/10 min to 9 g/10 min.

3. The high-density ethylene-based polymer of claim 1, wherein the α-olefin monomer comprises at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

4. The high-density ethylene-based polymer of claim 1, wherein, when the high-density ethylene-based polymer is a copolymer of the ethylene and the α-olefin monomer, a content of the α-olefin monomer is 0.1 wt % to 10 wt %.

5. The high-density ethylene-based polymer of claim 1, wherein the high-density ethylene-based polymer is prepared by using a catalyst comprising at least one first metallocene compound represented by Formula 1, at least one second metallocene compound represented by Formula 2, at least one cocatalyst compound, and a carrier:

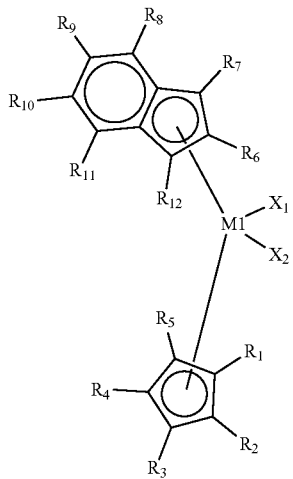

[Formula 1]

wherein, in Formula 1,
M1 is a group 4 transition metal of the periodic table of elements,
$X_1$ and $X_2$ are each independently one of halogen atoms,
$R_1$ to $R_{12}$ are each independently a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and are linked to each other to form a ring, and
cyclopentadienyl and indenyl are not linked to each other:

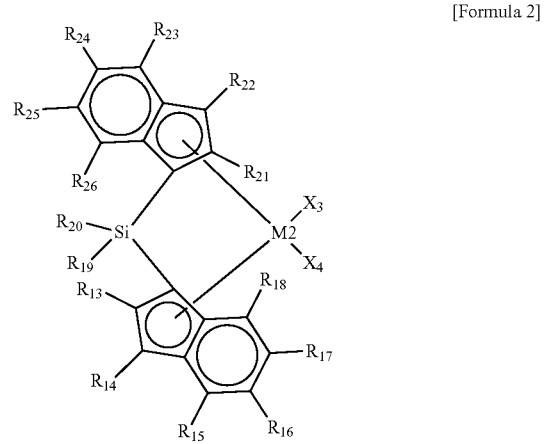

[Formula 2]

wherein, in Formula 2,
M2 is a group 4 transition metal of the periodic table of elements,
$X_3$ and $X_4$ are each independently one of halogen atoms,
$R_{13}$ to $R_{18}$ are each independently a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and are linked to each other to form a ring,
$R_{21}$ to $R_{26}$ are each independently a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and are linked to each other to form a ring,
$R_{19}$ and $R_{20}$ are each independently a substituted or unsubstituted $C_1$-$C_{20}$ alkyl group or may be linked to each other to form a ring,
indenyl linked to $R_{13}$ to $R_{18}$ and indenyl linked to $R_{21}$ to $R_{26}$ have the same structure or different structures, and
the indenyl linked to $R_{13}$ to $R_{18}$ and the indenyl linked to $R_{21}$ to $R_{26}$ are linked to Si to form a bridged structure.

6. The high-density ethylene-based polymer of claim 5, wherein the first metallocene compound comprises at least one compound selected from the group consisting of compounds having the following structures:

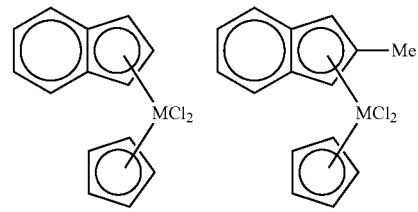

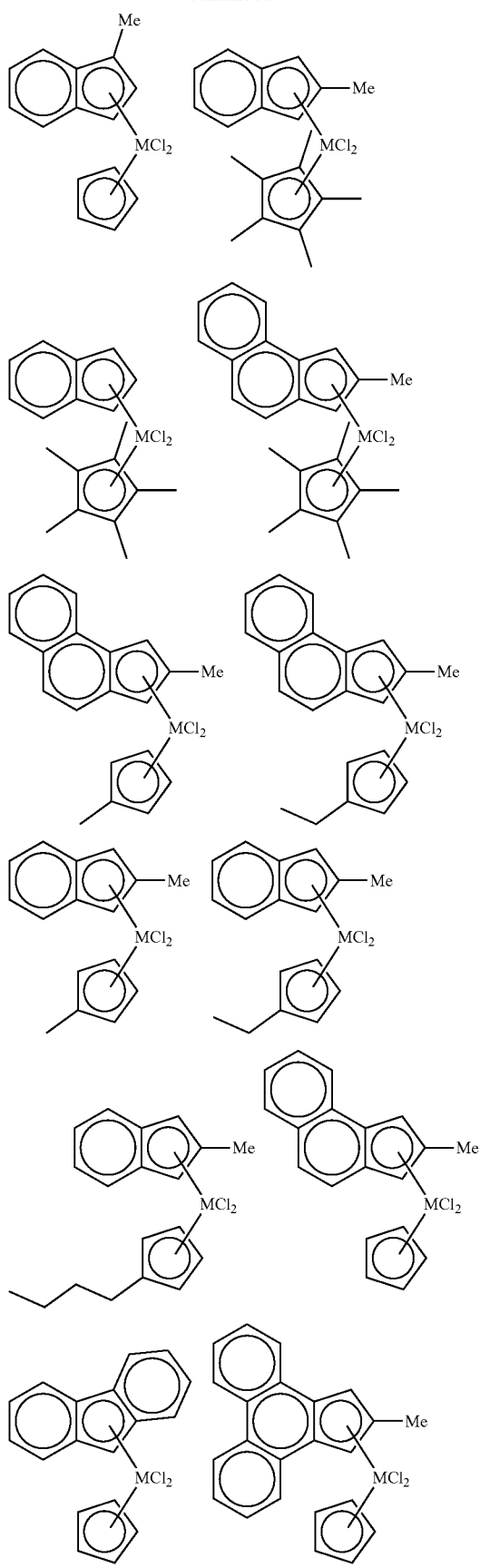
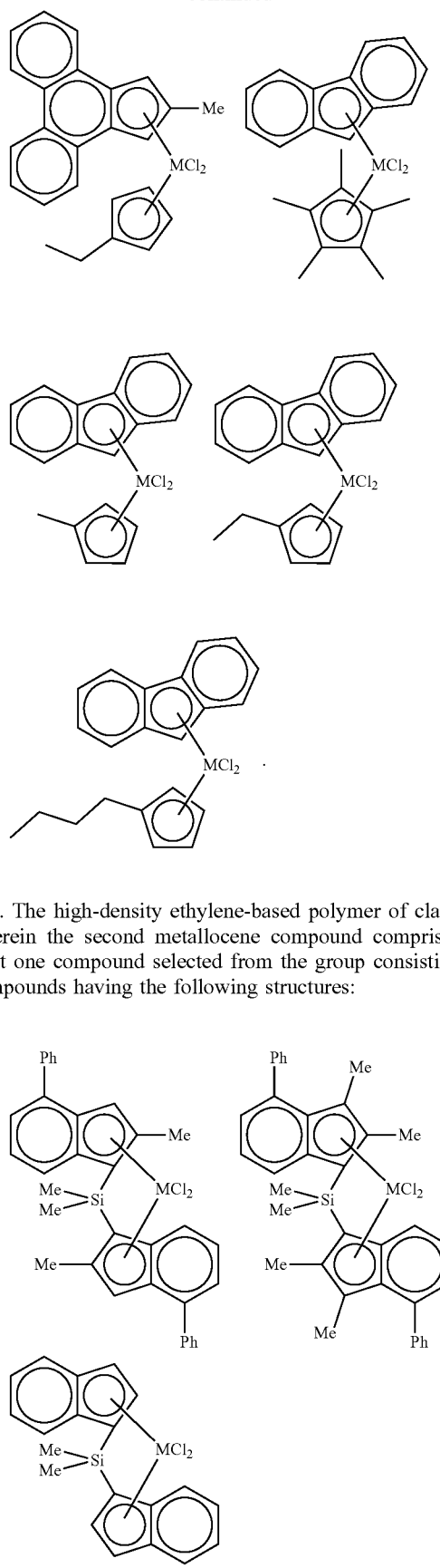
7. The high-density ethylene-based polymer of claim 5, wherein the second metallocene compound comprises at least one compound selected from the group consisting of compounds having the following structures:
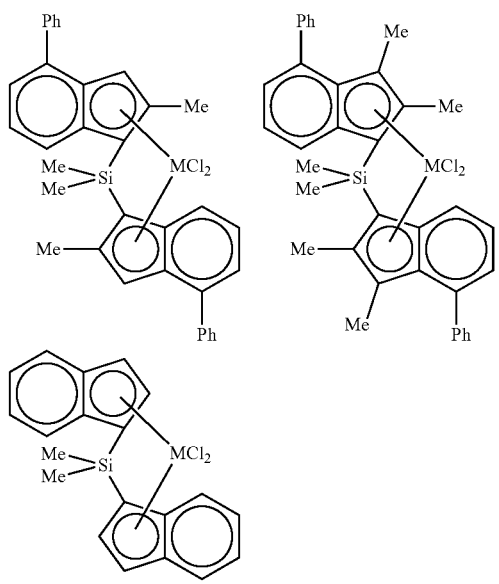

-continued
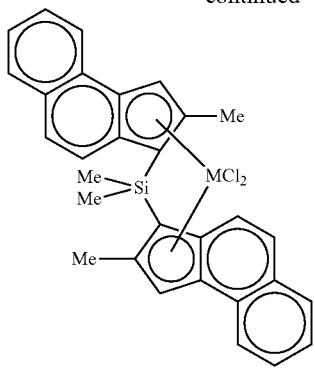
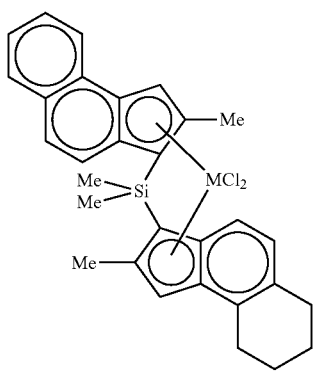
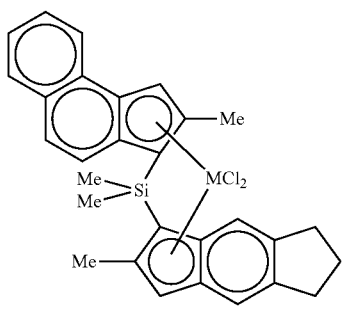
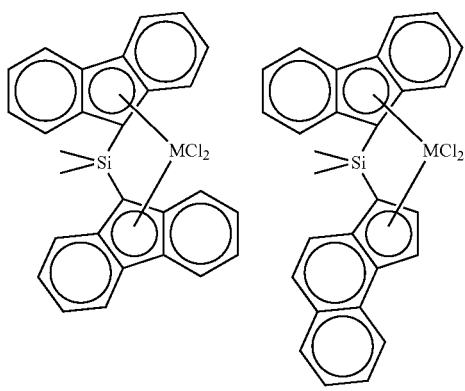
-continued
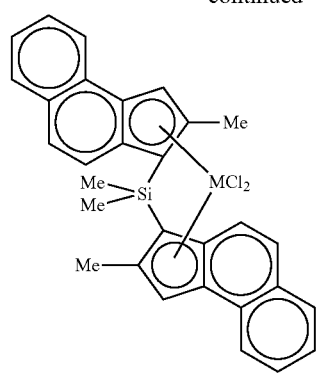
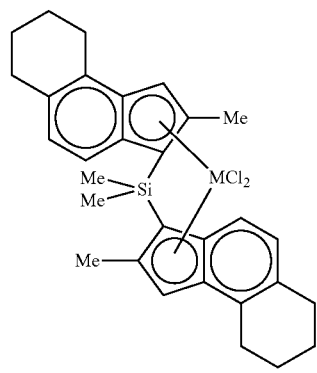
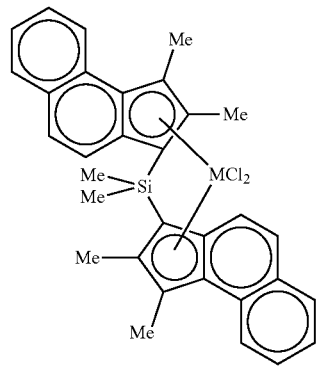
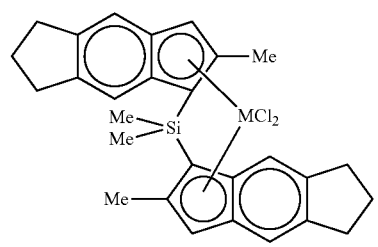
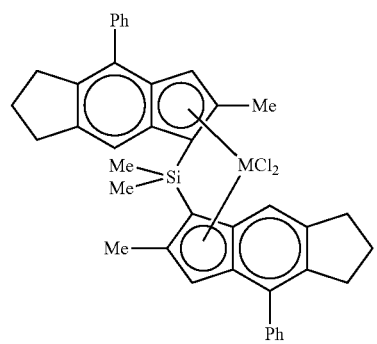

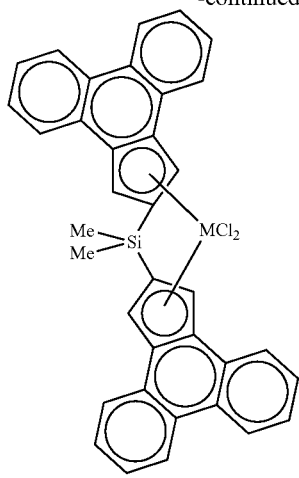
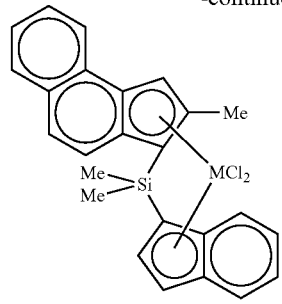
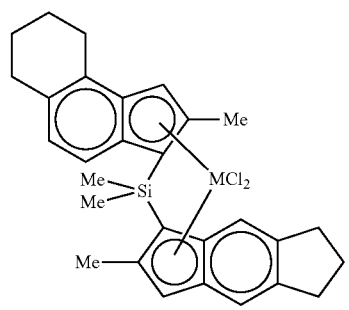
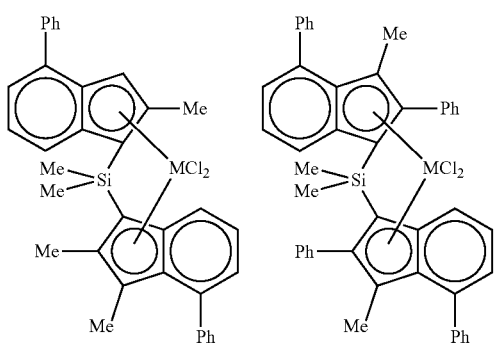
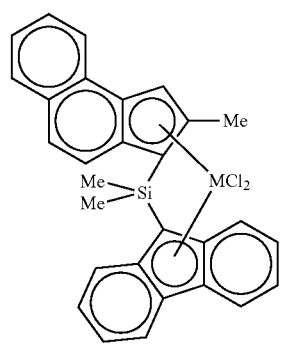
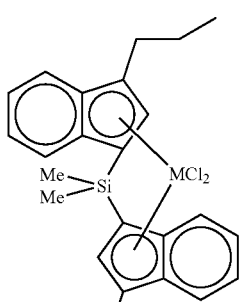
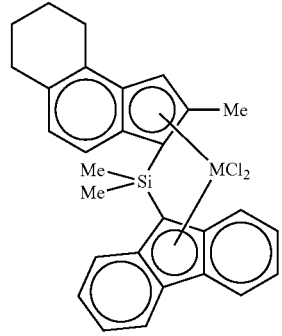
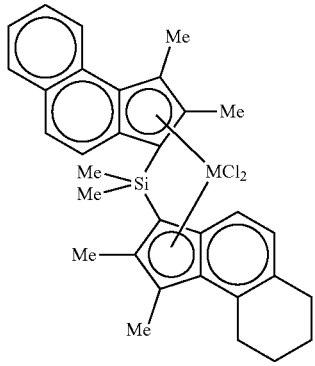
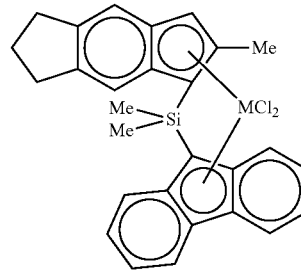

-continued

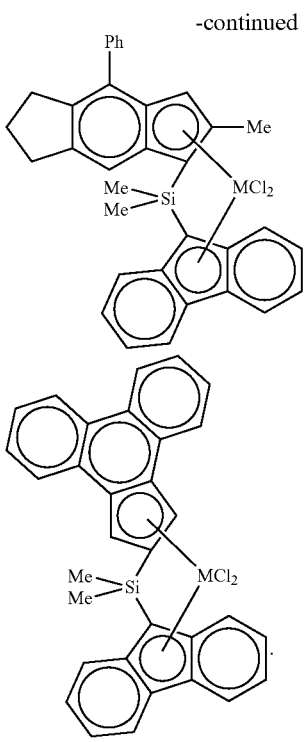

8. The high-density ethylene-based polymer of claim 5, wherein the cocatalyst compound comprises at least one compound selected from compounds represented by Formulae 3 to 6:

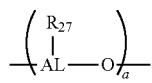
[Formula 3]

wherein, in Formula 3,
AL is aluminum,
$R_{27}$ is a halogen atom, a $C_1$-$C_{20}$ hydrocarbon group, or a $C_1$-$C_{20}$ hydrocarbon group substituted with halogen, and
a is an integer of 2 or more and Formula 3 is a repeating unit,

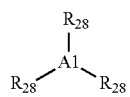
[Formula 4]

wherein, in Formula 4,
Al is aluminum or boron, and
$R_{28}$ each independently is a halogen atom, a $C_1$-$C_{20}$ hydrocarbon group, a $C_1$-$C_{20}$ hydrocarbon group substituted with halogen, or a $C_1$-$C_{20}$ alkoxy group,

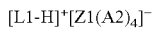
[Formula 5]

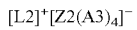
[Formula 6]

wherein, in Formulae 5 and 6,
$[L1\text{-}H]^+$ and $[L2]^+$ are neutral or cationic Lewis acids,
Z1 and Z2 are group 13 elements of the periodic table of elements, and A2 and A3 are a substituted or unsubstituted $C_6$-$C_{20}$ aryl group or a substituted or unsubstituted $C_1$-$C_{20}$ alkyl group.

9. The high-density ethylene-based polymer of claim 8, wherein the cocatalyst compound represented by Formula 3 comprises at least one selected from the group consisting of methylaluminoxane, ethylaluminoxane, isobutylaluminoxane, and butylaluminoxane.

10. The high-density ethylene-based polymer of claim 8, wherein the cocatalyst compound represented by Formula 4 comprises at least one compound selected from the group consisting of trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and tris(pentafluorophenyl)boron.

11. The high-density ethylene-based polymer of claim 8, wherein the cocatalyst compound represented by Formula 5 or 6 each independently comprises at least one selected from the group consisting of methyldioctadecylammonium tetrakis(pentafluorophenyl)borate, trimethylammonium tetraphenylborate, triethylammonium tetraphenylborate, tripropylammonium tetraphenylborate, tributylammonium tetraphenylborate, trimethylammonium tetrakis(p-tolyl)borate, tripropylammonium tetrakis(p-tolyl)borate, trimethylammonium tetrakis(o,p-dimethylphenyl)borate, triethylammonium tetrakis(o,p-dimethylphenyl)borate, trimethylammonium tetrakis(p-trifluoromethylphenyl)borate, tributylammonium tetrakis(p-trifluoromethylphenyl)borate, tributylammonium tetrakis(pentafluorophenyl)borate, diethylammonium tetrakis(pentafluorophenyl)borate, triphenylphosphonium tetraphenylborate, trimethylphosphonium tetraphenylborate, N,N-diethylanilinium tetraphenylborate, N,N-dimethylanilinium tetrakis(pentafluorophenyl)borate, N,N-diethylanilinium tetrakis(pentafluorophenyl)borate, triphenylcarbonium tetrakis(p-trifluoromethylphenyl)borate, triphenylcarbenium tetrakis(pentafluorophenyl)borate, trimethylammonium tetraphenylaluminate, triethylammonium tetraphenylaluminate, tripropylammonium tetraphenylaluminate, tributylammonium tetraphenylaluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl)aluminate, tributylammonium tetrakis(pentafluorophenyl)aluminate, N,N-diethylanilinium tetraphenylaluminate, N,N-diethylanilinium tetraphenylaluminate, N,N-diethylanilinium tetrakis(pentafluorophenyl)aluminate, diethylammonium tetrakis(pentafluorophenyl)aluminate, triphenylphosphonium tetraphenylaluminate, and trimethylphosphonium tetrakis(phenyl)aluminate.

12. The high-density ethylene-based polymer of claim 5, wherein the first metallocene compound and the second metallocene compound each independently have a central metal concentration of $1*10^{-5}$ mol/L to $9*10^{-5}$ mol/L.

13. The high-density ethylene-based polymer of claim 5, wherein a ratio of a total mass of transition metals of the first metallocene compound and the second metallocene compound to a mass of the carrier is 1:10 to 1:1,000, and a mass ratio of the first metallocene compound to the second metallocene compound is 1:100 to 100:1.

14. The high-density ethylene-based polymer of claim 8, wherein a mass ratio of the cocatalyst compound represented by Formulae 3 and 4 to the carrier is 1:100 to 100:1, and
a mass ratio of the cocatalyst compound represented by Formulae 5 and 6 to the carrier is 1:20 to 20:1.

15. The high-density ethylene-based polymer of claim 5, wherein the carrier comprises at least one selected from the group consisting of silica, magnesium, and alumina,
the carrier has an average particle size of 10 microns to 250 microns,
the carrier has a microporous volume of 0.1 cc/g to 10 cc/g, and
the carrier has a specific surface area of 1 m$^2$/g to 1,000 m$^2$/g.

16. A method for preparing a high-density ethylene-based polymer of claim 1, comprising the steps of:
preparing at least one first metallocene compound represented by Formula 1, at least one second metallocene compound represented by Formula 2, and at least one cocatalyst compound;
stirring the prepared first metallocene compound, the prepared second metallocene compound, and the cocatalyst compound at a temperature of 0° C. to 100° C. for 5 minutes to 24 hours to prepare a catalyst mixture;
adding the catalyst mixture to a reactor in which a carrier and a solvent are present, and stirring the mixture at a temperature of 0° C. to 100° C. for 3 minutes to 48 hours to prepare a supported catalyst composition;
precipitating the supported catalyst composition to separate a supernatant;
removing the supernatant and washing the supported catalyst composition with a solvent;
vacuum-drying the washed supported catalyst composition at a temperature of 20° C. to 200° C. for 1 hour to 48 hours to prepare a hybrid supported catalyst; and
adding the hybrid supported catalyst, at least one α-olefin monomer selected from the group consisting of α-olefins, and ethylene to an autoclave reactor or a gas phase polymerization reactor, and preparing the high-density ethylene-based polymer in an environment in which a temperature is 60° C. to 100° C. and a pressure is 10 bar to 20 bar:

[Formula 1]

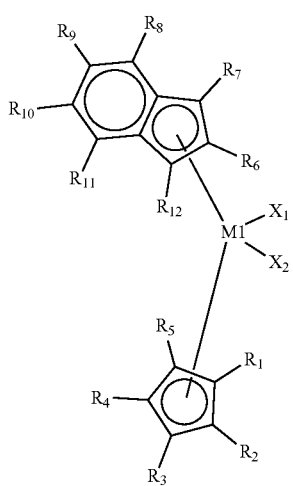

wherein, in Formula 1,
M1 is a group 4 transition metal of the periodic table of elements,
X$_1$ and X$_2$ are each independently one of halogen atoms,
R$_1$ to R$_{12}$ are each independently a hydrogen atom, a substituted or unsubstituted C$_1$-C$_{10}$ alkyl group, a substituted or unsubstituted C$_6$-C$_{20}$ aryl group, or a substituted or unsubstituted C$_7$-C$_{40}$ alkylaryl group or may be linked to each other to form a ring, and
cyclopentadienyl and indenyl are not linked to each other:

[Formula 2]

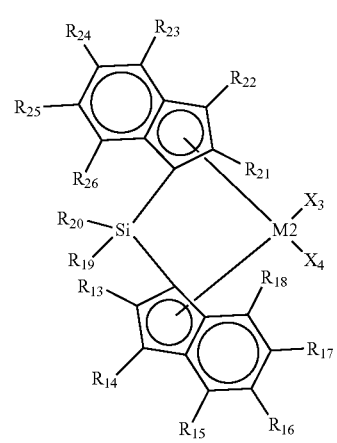

wherein, in Formula 2,
M2 is a group 4 transition metal of the periodic table of elements,
X$_3$ and X$_4$ are each independently one of halogen atoms,
R$_{13}$ to R$_{18}$ are each independently a hydrogen atom, a substituted or unsubstituted C$_1$-C$_{10}$ alkyl group, a substituted or unsubstituted C$_6$-C$_{20}$ aryl group, or a substituted or unsubstituted C$_7$-C$_{40}$ alkylaryl group and are linked to each other to form a ring,
R$_{21}$ to R$_{26}$ are each independently a hydrogen atom, a substituted or unsubstituted C$_1$-C$_{10}$ alkyl group, a substituted or unsubstituted C$_6$-C$_{20}$ aryl group, or a substituted or unsubstituted C$_7$-C$_{40}$ alkylaryl group and are linked to each other to form a ring,
R$_{19}$ and R$_{20}$ are each independently a substituted or unsubstituted C$_1$-C$_{20}$ alkyl group and are linked to each other to form a ring,
indenyl linked to R$_{13}$ to R$_{18}$ and indenyl linked to R$_{21}$ to R$_{26}$ have the same structure or different structures, and the indenyl linked to R$_{13}$ to R$_{18}$ and the indenyl linked to R$_{21}$ to R$_{26}$ are linked to Si to form a bridged structure.

17. The method of claim 16, wherein the cocatalyst compound comprises at least one compound selected from compounds represented by Formulae 3 to 6:

[Formula 3]

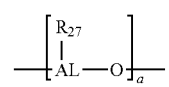

wherein, in Formula 3,
AL is aluminum,
R$_{27}$ is a halogen atom, a C$_1$-C$_{20}$ hydrocarbon group, or a C$_1$-C$_{20}$ hydrocarbon group substituted with halogen, and a is an integer of 2 or more and Formula 3 is a repeating unit,

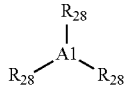 [Formula 4]

wherein, in Formula 4,
Al is aluminum or boron, and
$R_{28}$ each independently is a halogen atom, a $C_1$-$C_{20}$ hydrocarbon group, a $C_1$-$C_{20}$ hydrocarbon group substituted with halogen, or a $C_1$-$C_{20}$ alkoxy group,

[L1-H]$^+$[Z1(A2)$_4$]$^-$      [Formula 5]

[L2]$^+$[Z2(A3)$_4$]$^-$      [Formula 6]

wherein, in Formulae 5 and 6,
[L1-H]$^+$ and [L2]$^+$ are neutral or cationic Lewis acids,
Z1 and Z2 are group 13 elements of the periodic table of elements, and
A2 and A3 are a substituted or unsubstituted $C_6$-$C_{20}$ aryl group or a substituted or unsubstituted $C_1$-$C_{20}$ alkyl group.

18. The method of claim 16, wherein the solvent comprises at least one selected from the group consisting of hexane, pentane, toluene, benzene, dichloromethane, diethyl ether, tetrahydrofuran, acetone, and ethyl acetate.

19. The method of claim 16, wherein the first metallocene compound and the second metallocene compound each independently have a central metal concentration of $1*10^{-5}$ mol/L to $9*10^{-5}$ mol/L.

20. The method of claim 16, wherein the α-olefin monomer comprises at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

* * * * *